(12) United States Patent
Belisle et al.

(10) Patent No.: US 7,779,624 B2
(45) Date of Patent: Aug. 24, 2010

(54) JOINT FOR AN ENGINE EXHAUST SYSTEM COMPONENT

(75) Inventors: John I. Belisle, Hampton, MN (US); John T. Hansmann, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 685 days.

(21) Appl. No.: 11/222,674

(22) Filed: Sep. 8, 2005

(65) Prior Publication Data
US 2006/0053779 A1 Mar. 16, 2006

Related U.S. Application Data

(60) Provisional application No. 60/608,422, filed on Sep. 8, 2004, provisional application No. 60/608,266, filed on Sep. 8, 2004, provisional application No. 60/636,459, filed on Dec. 15, 2004.

(51) Int. Cl.
  *F01N 3/10* (2006.01)
(52) U.S. Cl. .................. 60/299; 60/297; 60/311; 60/322
(58) Field of Classification Search ............. 60/297, 60/311; 285/334.4, 334.5
  See application file for complete search history.

(56) References Cited

U.S. PATENT DOCUMENTS

| 2,271,425 A | 1/1942 | Harris |
| 2,363,236 A | 11/1944 | Fluor |
| 2,937,893 A * | 5/1960 | Hill et al. ............ 285/328 |
| 3,144,264 A * | 8/1964 | Lewis et al. ............ 265/367 |
| 3,380,810 A | 4/1968 | Hamblin |
| 3,645,093 A | 2/1972 | Thomas |
| 3,672,464 A | 6/1972 | Rowley et al. |
| 3,754,398 A | 8/1973 | Mattavi |
| 3,854,888 A | 12/1974 | Frietzsche et al. |
| 3,964,773 A | 6/1976 | Stade et al. |
| 3,964,875 A | 6/1976 | Chang et al. |
| 3,972,687 A | 8/1976 | Frietzsche |
| 4,032,310 A * | 6/1977 | Ignoffo ............ 422/170 |
| 4,050,903 A | 9/1977 | Bailey et al. |
| 4,086,063 A | 4/1978 | Garcea |
| 4,147,230 A | 4/1979 | Ormond et al. |
| 4,209,493 A | 6/1980 | Olson |

(Continued)

FOREIGN PATENT DOCUMENTS

DE 27 51 918 A1 5/1979

(Continued)

OTHER PUBLICATIONS

U.S. Appl. No. 11/223,460, filed Sep. 8, 2005.

*Primary Examiner*—Thomas E Denion
*Assistant Examiner*—Diem Tran
(74) *Attorney, Agent, or Firm*—Merchant & Gould P.C.

(57) ABSTRACT

The present disclosure relates to an access joint for an engine exhaust system. The access joint includes first and second exhaust conduits each having a conduit body and a flange unitary with the conduit body. The flanges have first surfaces that face toward one another and second surfaces that face away from one another. The joint also includes a clamp having a channel that receives the flanges and that compresses the flanges toward one another when the clamp is tightened.

24 Claims, 22 Drawing Sheets

U.S. PATENT DOCUMENTS

| | | | |
|---|---|---|---|
| 4,209,494 A | 6/1980 | Oya et al. | |
| 4,297,116 A | 10/1981 | Cusick | |
| 4,426,844 A | 1/1984 | Nakano | |
| 4,487,289 A | 12/1984 | Kicinski et al. | |
| 4,538,413 A | 9/1985 | Shinzawa et al. | |
| 4,541,240 A | 9/1985 | Munro | |
| 4,579,374 A * | 4/1986 | Bell | 285/334.4 |
| 4,601,168 A | 7/1986 | Harris | |
| 4,730,454 A | 3/1988 | Pischinger et al. | |
| 4,851,015 A | 7/1989 | Wagner et al. | |
| 4,866,932 A | 9/1989 | Morita et al. | |
| 4,899,540 A | 2/1990 | Wagner et al. | |
| 4,969,537 A | 11/1990 | Wagner et al. | |
| 5,043,147 A | 8/1991 | Knight | |
| 5,053,062 A | 10/1991 | Barris et al. | |
| 5,065,576 A | 11/1991 | Kanazawa et al. | |
| 5,110,560 A | 5/1992 | Presz, Jr. et al. | |
| 5,184,464 A | 2/1993 | Harris | |
| 5,220,789 A | 6/1993 | Riley et al. | |
| 5,302,783 A | 4/1994 | Sadr et al. | |
| 5,355,973 A | 10/1994 | Wagner et al. | |
| 5,408,828 A | 4/1995 | Kreucher et al. | |
| 5,426,269 A | 6/1995 | Wagner et al. | |
| 5,457,945 A | 10/1995 | Adiletta | |
| 5,782,089 A | 7/1998 | Machida et al. | |
| 5,808,245 A | 9/1998 | Wiese et al. | |
| 5,828,013 A | 10/1998 | Wagner et al. | |
| 5,916,530 A | 6/1999 | Maus et al. | |
| 6,076,632 A | 6/2000 | Schuhmacher et al. | |
| 6,250,422 B1 | 6/2001 | Goplen et al. | |
| 6,550,573 B2 | 4/2003 | Wagner et al. | |
| 6,632,406 B1 * | 10/2003 | Michelin et al. | 422/178 |
| 6,670,020 B1 | 12/2003 | Maus | |
| 6,868,670 B1 | 3/2005 | Schellin | |
| 6,892,854 B2 | 5/2005 | Wagner et al. | |
| 7,047,731 B2 * | 5/2006 | Foster et al. | 60/297 |
| 2003/0108457 A1 | 6/2003 | Gault et al. | |
| 2003/0159436 A1 | 8/2003 | Foster et al. | |
| 2004/0056485 A1 | 3/2004 | Love et al. | |
| 2006/0067860 A1 | 3/2006 | Faircloth, Jr. et al. | |

FOREIGN PATENT DOCUMENTS

| | | |
|---|---|---|
| DE | 29 34 143 A1 | 3/1981 |
| DE | 35 12 580 A1 | 10/1986 |
| DE | 38 15 148 A1 | 11/1989 |
| DE | 295 03 550.1 U1 | 6/1995 |
| EP | 0 396 151 A2 | 11/1990 |
| EP | 0 643 204 A2 | 3/1995 |
| EP | 0 696 677 | 2/1996 |
| EP | 0 768 451 A1 | 4/1997 |
| EP | 0 974 741 A1 | 1/2000 |
| FR | 2 178 470 | 11/1973 |
| FR | 2 718 214 A1 | 10/1995 |
| JP | 59-153916 | 9/1984 |
| JP | 63-93332 | 4/1988 |
| JP | 2-180642 | 7/1990 |
| WO | WO 01/42633 A1 | 6/2001 |
| WO | WO 2005/005797 A2 | 1/2005 |

* cited by examiner

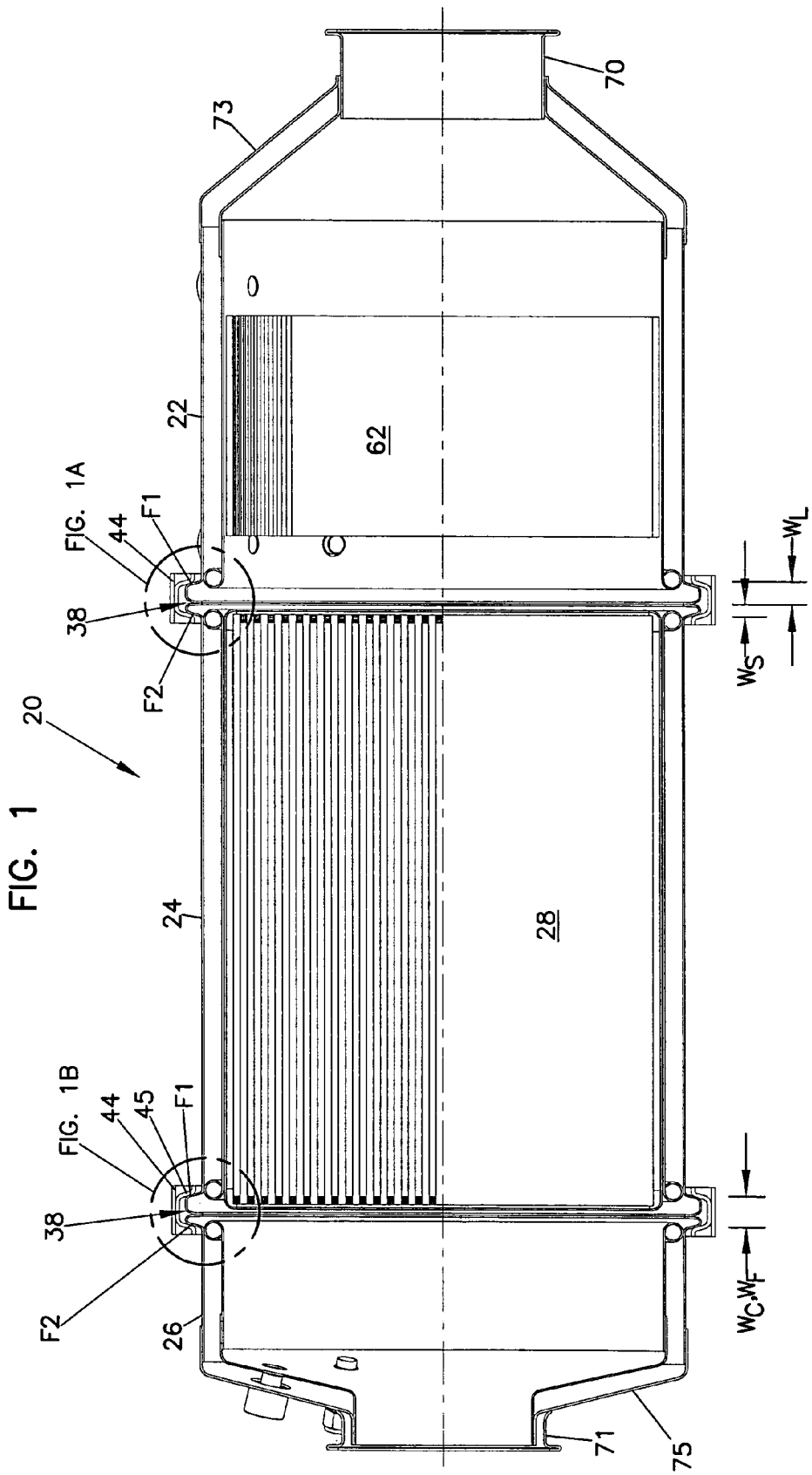

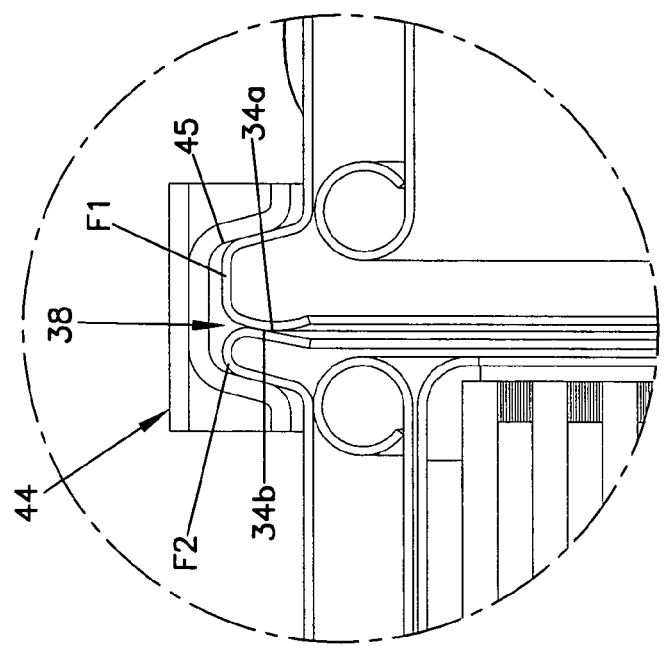
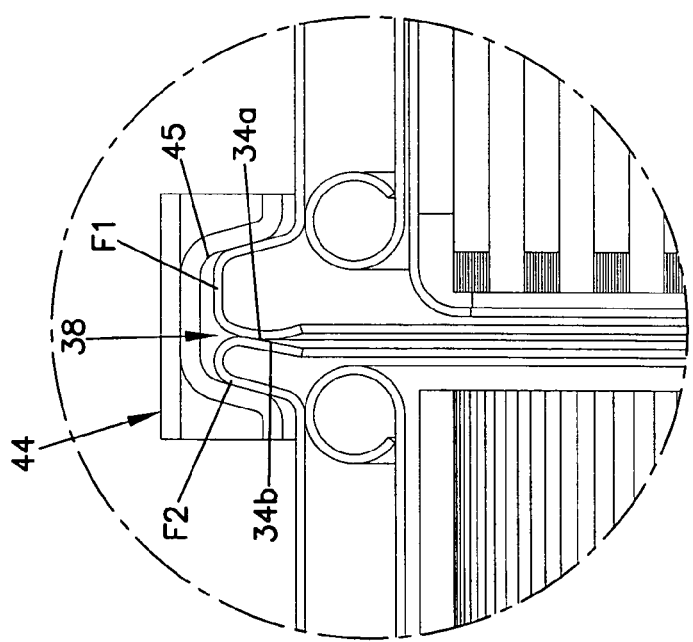

JOINT FOR AN ENGINE EXHAUST SYSTEM COMPONENT

This application claims the priority of U.S. Provisional Patent Application Ser. No. 60/608,422 filed Sep. 8, 2004, U.S. Provisional Patent Application Ser. No. 60/608,266 filed Sep. 8, 2004 and U.S. Provisional Patent Application Ser. No. 60/636,459 filed Dec. 15, 2004, which applications are hereby incorporated by reference in their entirety.

TECHNICAL FIELD

The present invention relates generally to access joints for engine exhaust system components.

BACKGROUND

To reduce air pollution, engine exhaust emissions standards have become increasingly more stringent. Aftertreatment devices have been developed to satisfy these increasingly stringent standards. For example, catalytic converters have been used to reduce the concentration of pollutant gases (e.g., hydrocarbons, carbon monoxide, nitric oxide, etc.) exhausted by engines. U.S. Pat. No. 5,355,973, which is hereby incorporated by reference, discloses an example catalytic converter. With respect to diesel engines, diesel particulate filters (DPF's) have been used to reduce the concentration of particulate matter (e.g., soot) in the exhaust stream. U.S. Pat. No. 4,851,015, which is hereby incorporated by reference, discloses an example diesel particulate filter. Other example types of aftertreatment devices include lean NOx catalyst devices, selective catalytic reduction (SCR) catalyst devices, lean NOx traps, or other device for removing for removing pollutants from engine exhaust streams.

Aftertreatment devices can be mounted within engine exhaust system components. To allow aftertreatment devices within exhaust system components to be serviced or replaced, the exhaust system components are often provided with access joints. A typical access joint is defined between two sections of an exhaust system component. The sections have flanged ends that are clamped together (e.g., by a v-band clamp) to form the access joint. By removing the clamp, the two sections can be disconnected to open the joint and provide access to an aftertreatment device within the engine exhaust component. It is desirable for access joints to be relatively leak-free.

SUMMARY

Certain aspects of the present disclosure relate to access joint configurations for engine exhaust system components adapted to house aftertreatment devices. In certain embodiments, the access joints include flanges that are unitary with outer bodies of the exhaust system components.

Examples representative of a variety of inventive aspects are set forth in the description that follows. The inventive aspects relate to individual features as well as combinations of features. It is to be understood that both the forgoing general description and the following detailed description merely provide examples of how the inventive aspects may be put into practice, and are not intended to limit the broad spirit and scope of the inventive aspects.

BRIEF DESCRIPTION OF THE DRAWINGS

FIG. 1 is a cross sectional view of an exhaust system arrangement having features that are examples of inventive aspects in accordance with the principles of the present disclosure, the arrangement is shown with the mid-section clamps not fully tightened;

FIG. 2A is an enlarged, detailed view of the first flange interface of the arrangement of FIG. 2;

FIG. 2B is an enlarged, detailed view of the second flange interface of the arrangement of FIG. 2;

DETAILED DESCRIPTION

Figure 1A:
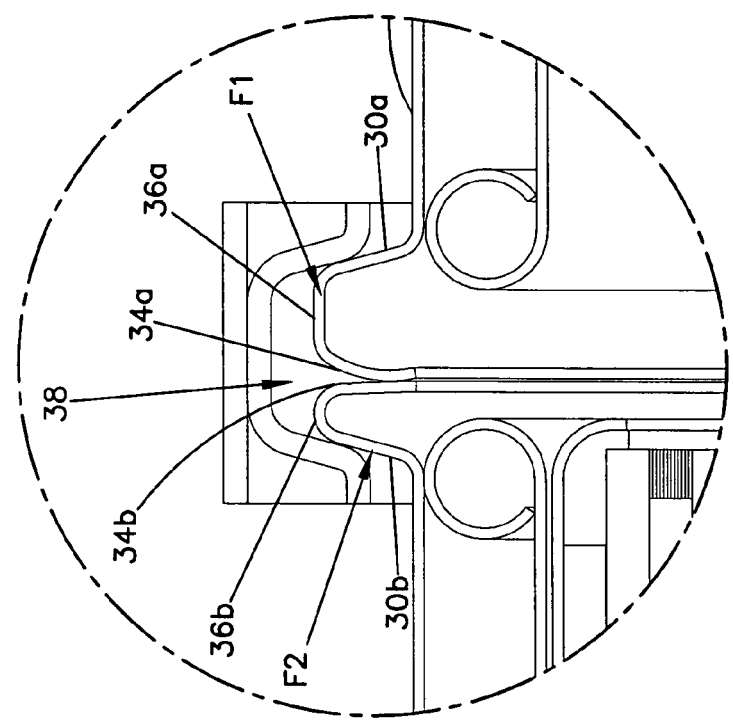
FIG. 1A is an enlarged, detailed view of a first flange interface of the arrangement of FIG. 1.

In the following detailed description, references are made to the accompanying drawings that depict various embodiments which are examples of how certain inventive aspects may be practiced. It is to be understood that other embodiments may be utilized, and structural and functional changes may be made without departing from the broad scope of the inventive aspects.

FIG. 1 illustrates an exhaust system component 20 including a first conduit 22, a second conduit 24, and a third conduit 26. The second conduit 24 is mounted between the first and third conduits 22, 26. An aftertreatment device 28 is mounted within the second conduit 24. Flange interfaces 38 (i.e., access joints) are provided between the first and second conduits 22, 24 and between the second and third conduits 24, 26. Clamps 44 (e.g., v-band clamps) are provided at the flange interfaces 38 to secure the conduits 22, 24 and 26 together. The clamps have channels 45 with interior walls that converge such that the channels have tapered cross-sections.

Figure 1B:
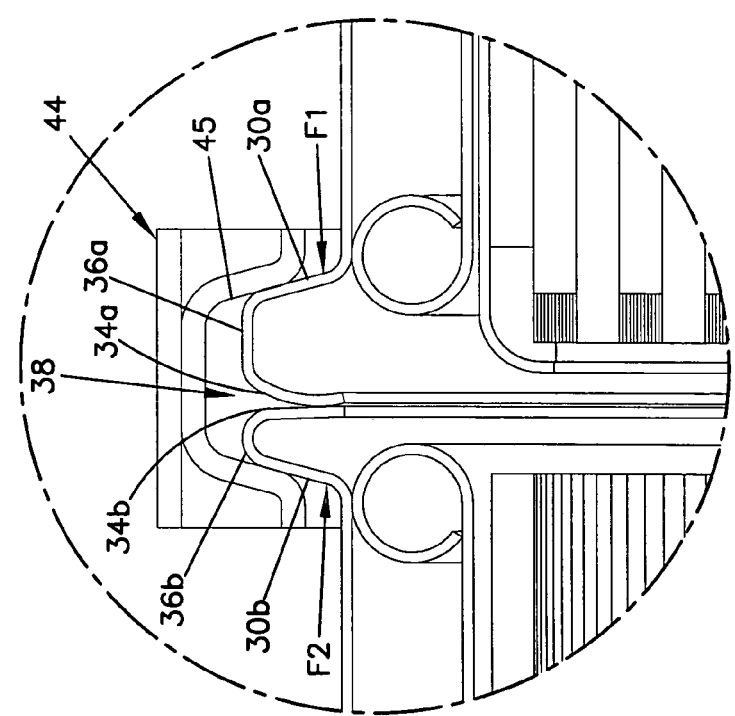
FIG. 1B is an enlarged, detailed view of a second flange interface of the arrangement of FIG. 1.

Each of the flange interfaces 38 includes a first flange F1 and a second flange F2. Referring to FIGS. 1A and 1B, the first flange F1 includes a ring-shaped sealing surface 34a that opposes a ring-shaped sealing surface 34b of the second flange F2. The flanges F1 include clamping shoulders 30a that project outwardly from the main bodies of the conduits, and bridge portions 36a that connect the shoulders 30a to the sealing surfaces 34a. The flanges F2 include clamping shoulders 30b that project outwardly from the main outer bodies of the conduits, and bridge portions 36b that connect the shoulders 30b to the sealing surfaces 34b. In the depicted embodiment, the sealing surface 34b is generally planar, while the sealing surface 34a is curved. For example, the sealing surface 34a is depicted having a convex curvature such that the surface 34a is generally toroidal in shape.

In a preferred embodiment, the flanges F1, F2 are integrally formed with a main outer wall/body of their corresponding conduits 22, 24, 26. In this way, the flanges are unitary (i.e., coupled by a connection without any intermediate seams, joints or welds) with the outer bodies. In one embodiment, the flanges and the main outer bodies are made of the same material (e.g., aluminized 409 stainless steel). The flanges may be formed by bending, pressing, forming or otherwise conforming the ends of cylindrical conduits into the desired shape.

Figure 2:
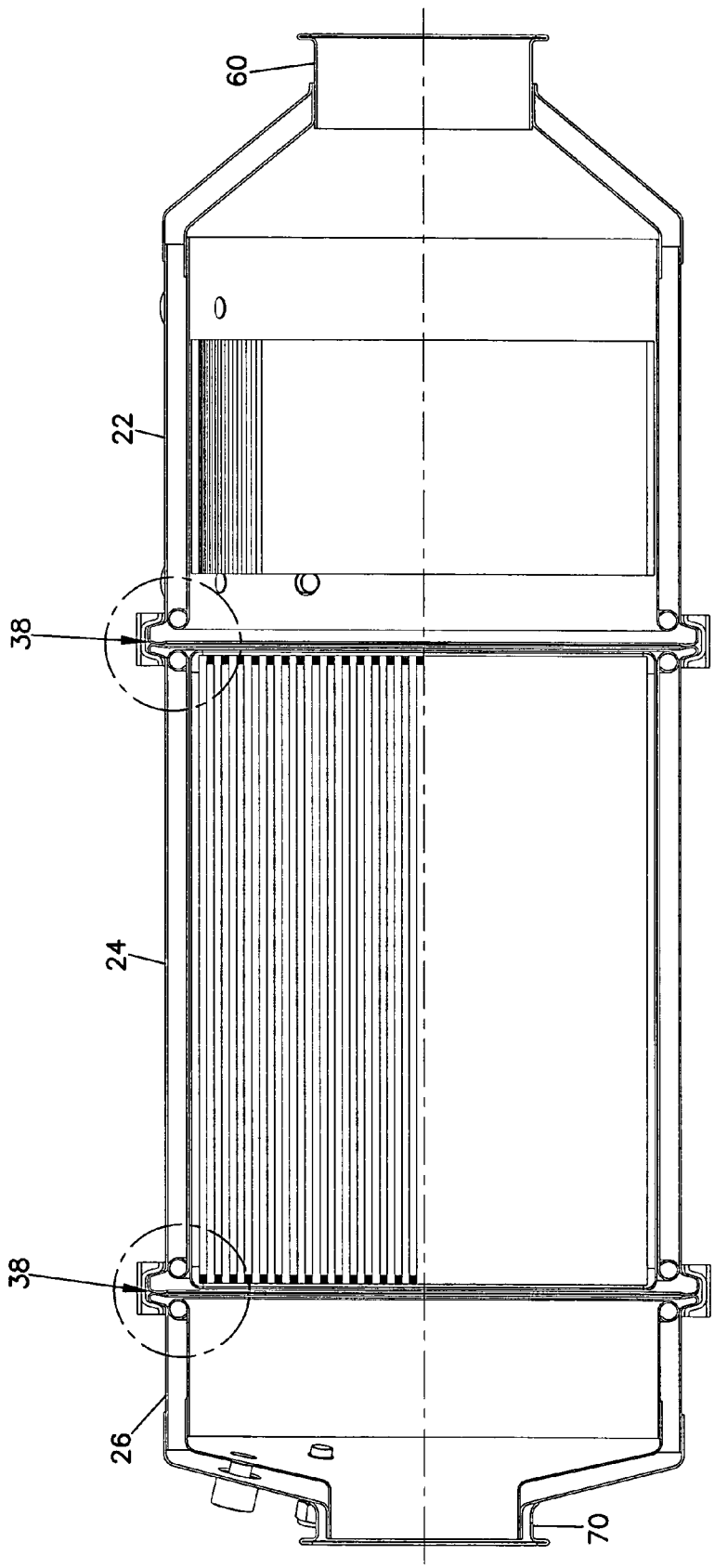
FIG. 2 is a cross sectional view of the exhaust arrangement of FIG. 1 with the clamps fully tightened.

In assembling the component, the conduit 24 is positioned between the conduits 22, 26 and the clamps 44 are loosely positioned at the flange interfaces 38 as shown at FIGS. 1, 1A and 1B. The clamps 44 are then tightened about the flange interfaces 38 as shown at FIGS. 2, 2A and 2B. When the clamps are tightened, the tapers of the clamp channels 45 contact the shoulders 30a, 30b causing the sealing surfaces 34a, 34b to be compressed together. Upon compression, the curved sealing surface 34a makes general line contact with the sealing surface 34b such that a ring of general line contact is formed between the flanges F1 and F2. During compression, the rounded shape of the sealing surface 34a can cause the flange F1 to deflect or otherwise move to take up any inconsistencies in the flanges and to provide for enhanced engagement. Similarly, the flange F2 can move/deflect during compression.

In the depicted embodiment of FIG. 1, the component 20 comprises a housing for an aftertreatment device. The conduit 22 forms an inlet section having a flanged end 70 adapted for connection to an inlet pipe, while the conduit 26 forms an outlet section having a flanged end 71 adapted for connection to an outlet pipe. The inlet section includes a diameter expander 73 while the outlet section includes a diameter reducer 75. The expanded diameter provides some sound attenuation/muffling, and the component may therefore be characterized as a muffler. A diesel oxidation catalyst 62 (i.e., a catalytic converter) is shown mounted within the conduit 22. The aftertreatment device 28 mounted within the conduit 24 is depicted as a diesel particulate filter. The flange interfaces 38 allow the diesel particulate filter to be easily accessed for servicing (e.g., cleaning).

Aftertreatment devices such as diesel particulate filters have a preferred direction for exhaust to flow through the filters. If mounted backwards, exhaust will flow the wrong direction through the DPF and the DPF will not perform as desired. To prevent the aftertreatment device 28 from being mounted backwards within the unit of FIG. 1, the flanges and clamps of the unit are configured such that the second conduit 24 needs to be oriented in the proper orientation if it is to be clamped between the first and third conduits 22, 26. For example, the flanges F2 at the upstream ends of the second and third conduits 24, 26 have widths $W_S$ (shown in FIG. 1) while the flanges F1 at the downstream ends of the first and second conduits 20, 22 have widths $W_L$ (shown in FIG. 1). The widths $W_S$ are smaller than widths $W_L$. The flanges F1 and F2 together define widths $W_F$ at the flange interfaces 38 that correspond to widths $W_C$ defined by the channels of the clamps 44. Thus, the flanges F1 and F2 are adapted to fit within the channels 45 of the clamps prior to tightening of the clamps 44 (see FIGS. 1, 1A and 1B), and are adapted to be compressed together by the interiorly tapered channels when the clamps are tightened (see FIGS. 2, 2A and 2B). When the flanges F1 and F2 are compressed together, end faces 34a, 34b of the flanges are forced into contact with one another to provide seals at the flange interfaces 38. The flange configurations, in combination with the channel size of the clamps, ensures that the conduit 24 can only be mounted at the proper directional orientation relative to the conduits 22 and 26 (as shown in FIGS. 1 and 2). In the event an installer attempts to improperly install the conduit, the resultant flange interfaces define widths that do not match the width $W_C$ of the clamps 44. For example, the upstream flange interface would define a width that is larger than the width $W_C$, while the downstream flange interface would defines a width that is smaller than the width $W_C$.

Figure 3:
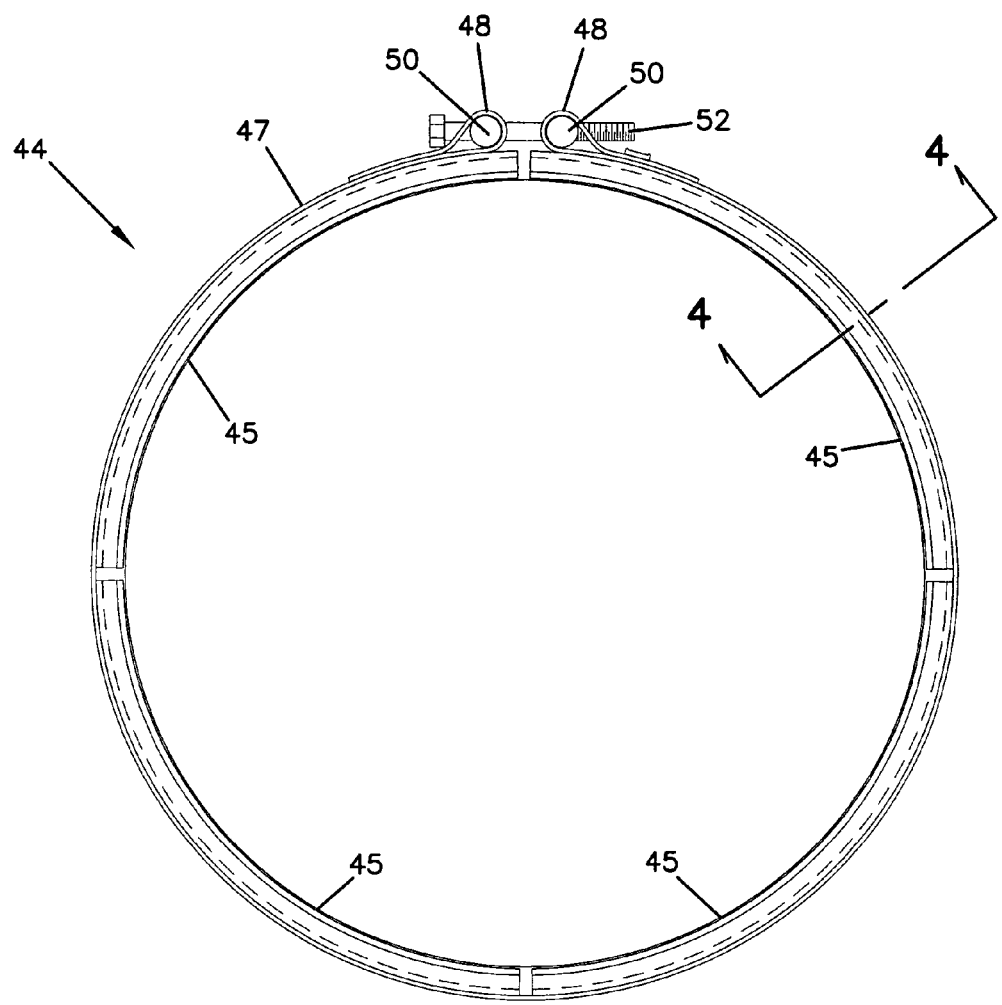
FIG. 3 illustrates an example clamp adapted for use at the first and second flange interfaces of the exhaust arrangement of FIG. 1.
Figure 4:
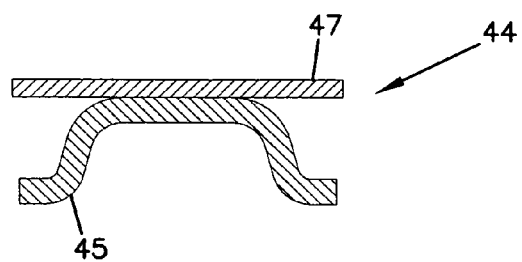
FIG. 4 is a cross sectional view taken along section line 4-4 of FIG. 3.

The clamps 44 are preferably v-band clamps which define v-shaped channels 45 adapted to fit over the exterior of the flange interfaces 38. FIGS. 3 and 4 show an example clamp 44 in isolation from the exhaust system component. The clamp 44 includes channel segments 45 secured to a strap 47. Ends 48 of the strap 47 are looped. Trunions 50 are mounted within the looped ends of the strap 47. One or more fasteners 52 extend between the trunions for tightening and loosening the clamp 44. As used herein, the term "a channel" is intended to include a single channel as well as plural channels.

As described above, the aftertreatment device 28 is identified as a diesel particulate filter. However, it will be appreciated that flange interface configurations in accordance with the principles of the present disclosure can be used to mount any type of aftertreatment device to an exhaust system. Example aftertreatment devices include catalytic converters, diesel particulate filters, lean NOx catalyst devices, selective catalytic reduction (SCR) catalyst devices, lean NOx traps, or other devices for removing for removing pollutants from the exhaust stream.

Catalytic converters are commonly used to convert carbon monoxides and hydrocarbons in the exhaust stream into carbon dioxide and water. Diesel particulate filters are used to remove particulate matter (e.g., carbon based particulate matter such as soot) from an exhaust stream. Lean NOx catalysts are catalysts capable of converting NOx to nitrogen and oxygen in an oxygen rich environment with the assistance of low levels of hydrocarbons. For diesel engines, hydrocarbon emissions are too low to provide adequate NOx conversion, thus hydrocarbons are required to be injected into the exhaust stream upstream of the lean NOx catalysts. SCR's are also capable of converting NOx to nitrogen and oxygen. However, in contrast to using HC's for conversion, SCR's use reductants such as urea or ammonia that are injected into the exhaust stream upstream of the SCR's. NOx traps use a material such as barium oxide to absorb NOx during lean burn operating conditions. During fuel rich operations, the NOx is desorbed and converted to nitrogen and oxygen by catalysts (e.g., precious metals) within the traps.

Diesel particulate filter substrates can have a variety of known configurations. An exemplary configuration includes a monolith ceramic substrate having a "honey-comb" configuration of plugged passages as described in U.S. Pat. No. 4,851,015 that is hereby incorporated by reference in its entirety. Wire mesh configurations can also be used. In certain embodiments, the substrate can include a catalyst. Exemplary catalysts include precious metals such as platinum, palladium and rhodium, and other types of components such as base metals or zeolites.

For certain embodiments, diesel particulate filters can have a particulate mass reduction efficiency greater than 75%. In other embodiments, diesel particulate filters can have a particulate mass reduction efficiency greater than 85%. In still other embodiments, diesel particulate filters can have a particulate mass reduction efficiency equal to or greater than 90%. For purposes of this specification, the particulate mass reduction efficiency is determined by subtracting the particulate mass that enters the filter from the particulate mass that exits the filter, and by dividing the difference by the particulate mass that enters the filter.

Catalytic converter substrates can also have a variety of known configurations. Exemplary configurations include substrates defining channels that extend completely therethrough. Exemplary catalytic converter configurations having both corrugated metal and porous ceramic substrates/cores are described in U.S. Pat. No. 5,355,973, that is hereby incorporated by reference in its entirety. The substrates preferably include a catalyst. For example, the substrate can be made of a catalyst, impregnated with a catalyst or coated with a catalyst. Exemplary catalysts include precious metals such as platinum, palladium and rhodium, and other types of components such as base metals or zeolites.

In one non-limiting embodiment, a catalytic converter can have a cell density of at least 200 cells per square inch, or in the range of 200-400 cells per square inch. A preferred catalyst for a catalytic converter is platinum with a loading level greater than 30 grams/cubic foot of substrate. In other embodiments the precious metal loading level is in the range of 30-100 grams/cubic foot of substrate. In certain embodiments, the catalytic converter can be sized such that in use, the catalytic converter has a space velocity (volumetric flow rate through the DOC/volume of DOC) less than 150,000/hour or in the range of 50,000-150,000/hour. In still other embodiments, the cell densities, catalyst types, catalyst loadings and space velocities can be varied from those specified above.

Figure 5:
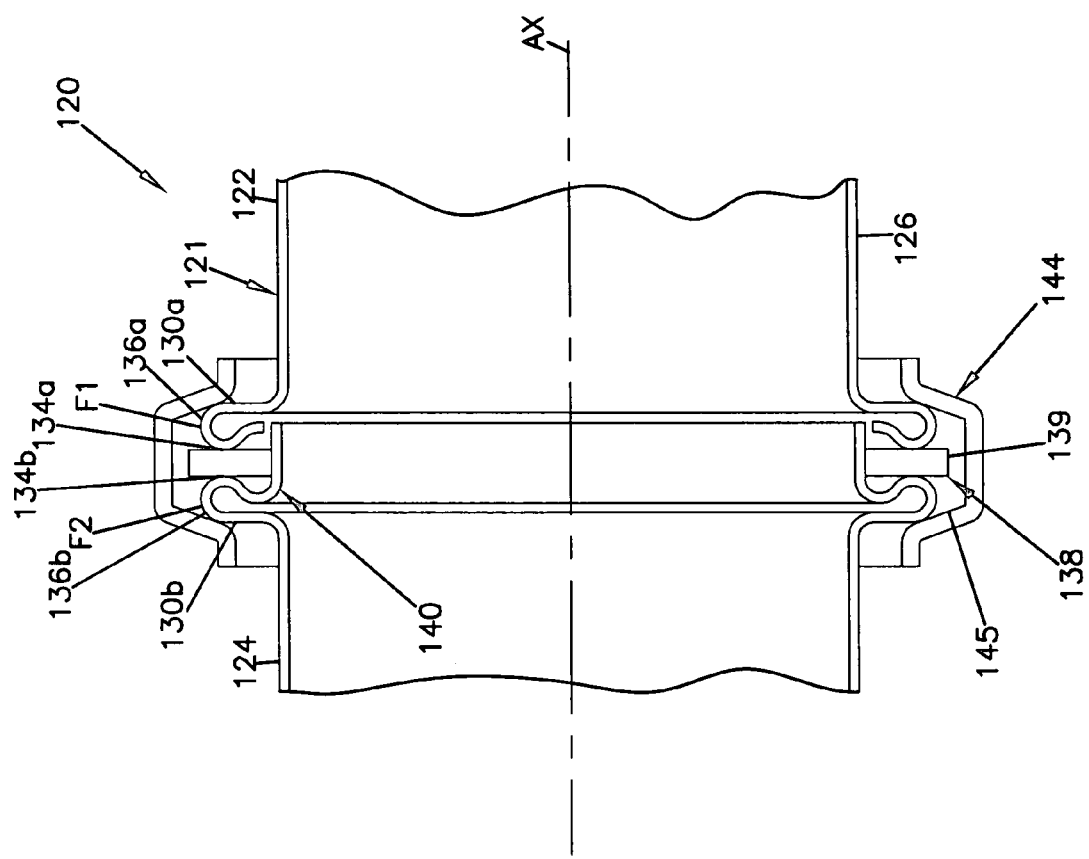
FIG. 5 illustrates an exhaust system component that is a second embodiment in accordance with the principles of the present disclosure.

FIG. 5 shows a second access joint 138 in accordance with the principles of the present disclosure. The access joint 138 is part of an exhaust system component 120 having a main outer body 121 defined by a first conduit 122 and a second conduit 124. A first flange F1 is unitary with one end of the first conduit 122, and a second flange F2 is unitary with one end of the second conduit 124. The flanges F1, F2 extend about perimeters of the conduits. The flanges F1, F2 include clamping shoulders 130*a*, 130*b* that project outwardly from the main outer body 121. As depicted in FIG. 5, the clamping shoulders 130*a*, 130*b* are aligned generally perpendicular relative to a central axis AX of the exhaust system component 120. The flanges F1, F2 also include sealing portions 134*a*, 134*b* that oppose one another, and curved bridge portions 136*a*, 136*b* that extend between the clamping shoulders 130*a*, 130*b* and the sealing portions 134*a*, 134*b*. The sealing portions 134*a*, 134*b* include convex sealing surfaces that oppose one another. An annular sealing gasket 139 (e.g., a fiber reinforced graphite gasket, a metal foil gasket, a ceramic fiber gasket, or other materials) is positioned between the sealing surfaces of the sealing portions 134*a*, 134*b*. The flange F2 further includes a cylindrical pilot or guide portion 140. In the depicted embodiment, the guide portion 140 is generally parallel to and centered about the central axis AX. The gasket 139 is mounted over the guide portion 140. In use, a portion of the guide portion 140 extends into an opening defined by the flange F1 to provide axial alignment between the first and second conduits 122, 124.

In use, the conduits 122, 124 are axially aligned relative to one another (as shown in FIG. 5) with the sealing portions 134*a*, 134*b* of the flanges F1, F2 opposing one another. The gasket 139 is mounted between the flanges F1, F2. A clamp 144 (e.g., a v-band clamp) having a channel 145 is mounted circumferentially around the flanges F1, F2. When the clamp 144 is tightened, the taper of the channel 145 contacts the shoulders 130*a*, 130*b* causing the sealing portions 134*a*, 134*b* to be compressed against the gasket 139. Upon compression, the sealing portions 134*a*, 134*b* of the flanges F1, F2 make opposing rings of contact with the gasket 139. During compression, the bridge portions 136*a*, 136*b* allow the sealing portions 134*a*, 134*b* to deflect or otherwise move to take up inconsistencies in the flanges and to provide for enhanced engagement with the gasket 139.

Figure 6:
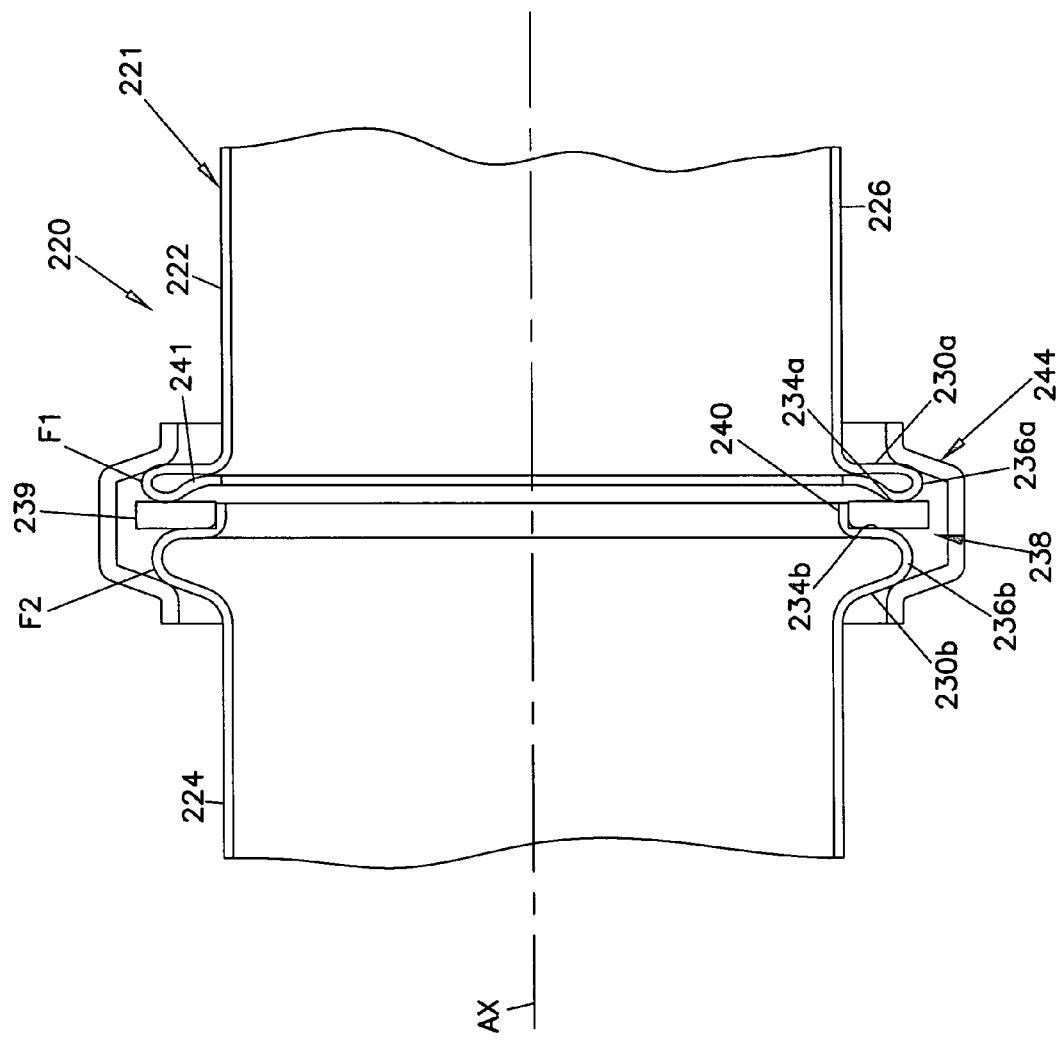
FIG. 6 illustrates an exhaust system component that is a third embodiment in accordance with the principles of the present disclosure.

FIG. 6 shows a third access joint 238 in accordance with the principles of the present disclosure. The access joint 238 is part of an exhaust system component 220 having a main outer body 221 defined by first and second conduits 222, 224. The conduits 222, 224 respectively define first and second flanges F1, F2 that extend about the perimeters of the conduits. The flanges F1, F2 include clamping shoulder portions 230*a*, 230*b*, sealing portions 234*a*, 234*b* and bridge portions 236*a*, 236*b* that connect the clamping shoulders 230*a*, 230*b* to the sealing portions 234*a*, 234*b*. The clamping shoulder 230*a* of the flange F1 is generally perpendicular relative to a central axis AX, while the clamping shoulder 230*b* of the flange F2 is angled relative to the axis AX. The sealing portion 234*b* of the flange F2 is generally planar and aligned generally perpendicular relative to the axis AX, while the sealing portion 234*a* of the flange F1 defines a convex curvature that faces toward the flange F2. The flange F2 further includes a cylindrical extension 240 on which a gasket 239 is mounted. The flange F1 includes a bent portion 241 that extends from the sealing portion back to the clamping shoulder 230. A clamp 244 (e.g., a v-band clamp) can be used to secure the connection.

Figure 7:
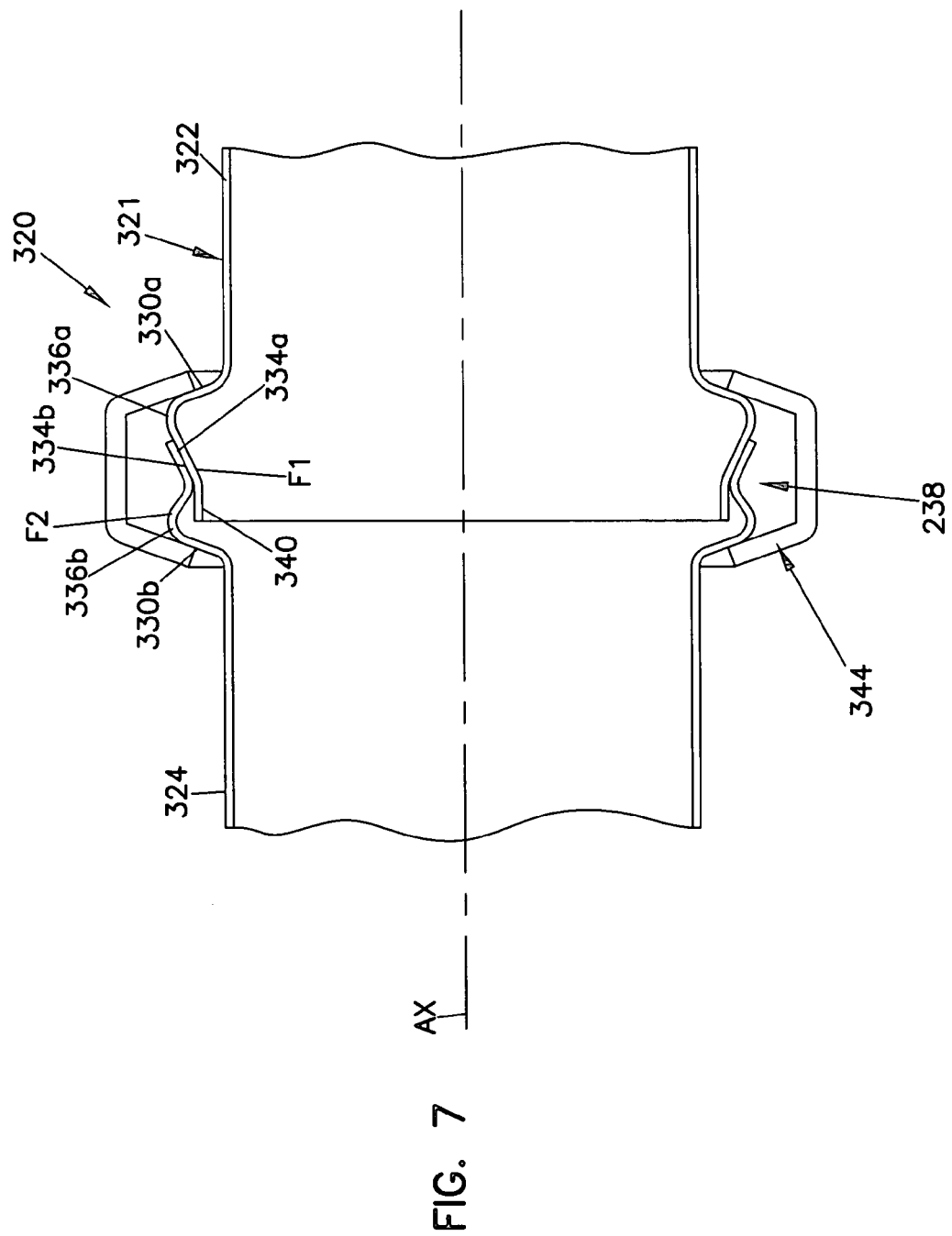
FIG. 7 illustrates an exhaust system component that is a fourth embodiment in accordance with the principles of the present disclosure.

FIG. 7 shows a fourth access joint 338 in accordance with the principles of the present disclosure. The access joint 338 is part of an exhaust system component 320 (e.g., a housing/enclosure for holding an exhaust aftertreatment device) including a main outer body 321 defined by first and second conduits 322, 324. The first conduit 322 includes a first flange F1 and the second conduit 324 includes a second flange F2. The flanges F1, F2 extend about the perimeters of the conduits. The flanges F1, F2 include clamping shoulders 330*a*, 330b and sealing portions 334a, 334b. Curved segments 336a, 336b respectively extend between the clamping shoulders 330a, 330b and the sealing portions 334a, 334b. The clamping shoulders 330a, 330b are aligned at oblique angles relative to a central longitudinal axis AX of the exhaust system component 320. The sealing portions 334a, 334b are also aligned at oblique angles relative to the central axis AX. The sealing portions 334a, 334b each have conical shapes. The sealing portion 334a decreases in diameter as the sealing portion 334a extends in a direction toward the second conduit 324. The sealing portion 334b defines a diameter that increases in magnitude as the sealing portion 334b extends toward the first conduit 322. The flange F1 includes a pilot portion 340 that is generally parallel to the central axis AX. A clamp 344 is used to couple the flanges F1, F2 together. When the clamp is tightened, the clamp engages the shoulders 330a, 330b causing the sealing portion 334a, 334b to nest together thereby providing an annular seal.

Figure 8:
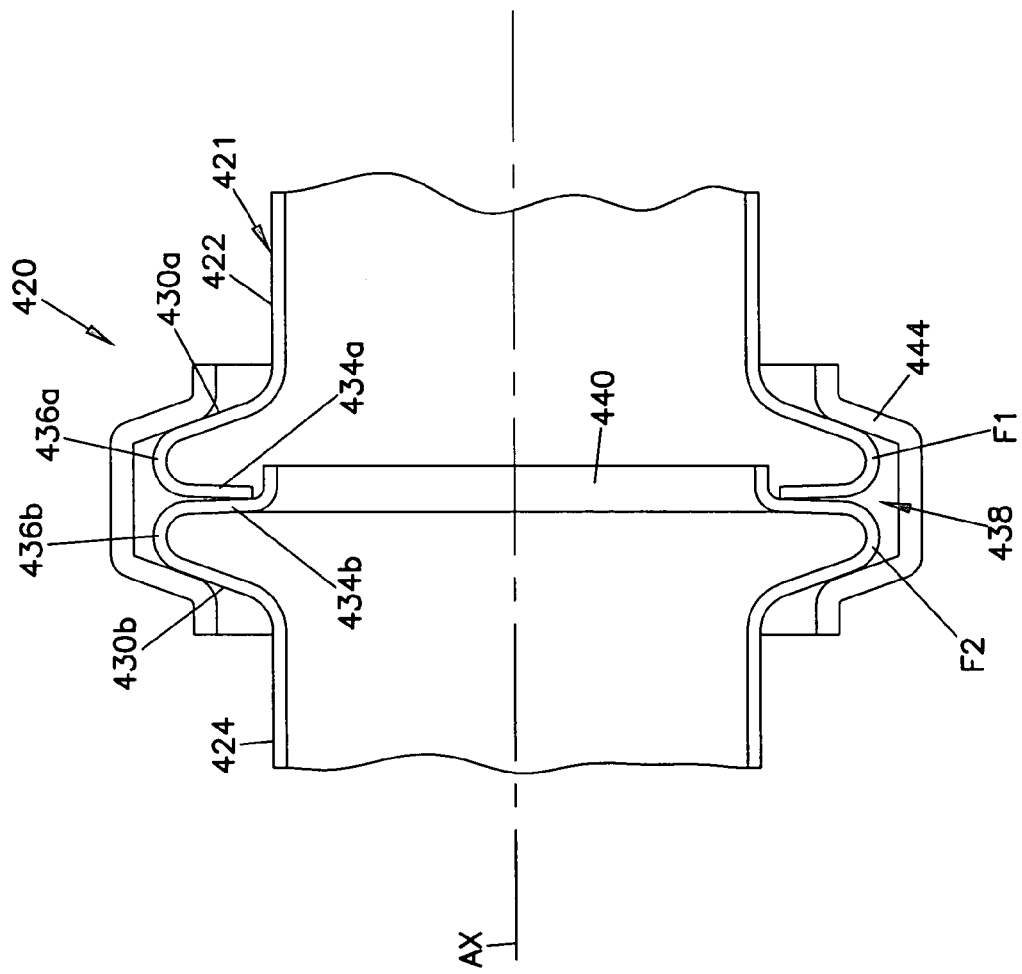
FIG. 8 illustrates an exhaust system component that is a fifth embodiment in accordance with the principles of the present disclosure.

FIG. 8 shows a fifth access joint 438 in accordance with the principles of the present disclosure. The access joint 438 is part of an exhaust system component 420 having a main outer body 421 defined by first and second conduits 422, 424. Flanges F1, F2 are respectively defined at the ends of the conduits 422, 424. The flanges F1, F2 include clamping shoulder portions 430a, 430b, sealing portions 434a, 434b curved bridge portions 436a, 436b. A cylindrical pilot portion 440 is provided at the end of the sealing portion 434b. The flanges F1, F2 extend about the perimeters of the conduits 422, 424. The clamping shoulder portions 430a, 430b are angled relative to a central axis AX of the component 420. As shown in FIG. 8, the clamping shoulder portions 430a, 430b converge towards one another as the shoulders extend away from the axis AX. The sealing portions 434a, 434b are also angled relative to the axis AX. The sealing portions 434a, 434b converge as the sealing portions extend toward the axis AX. A clamp 444 is used to compress the flanges F1, F2 together to provide an annular seal between the sealing portions 434a, 434b.

Figure 9:
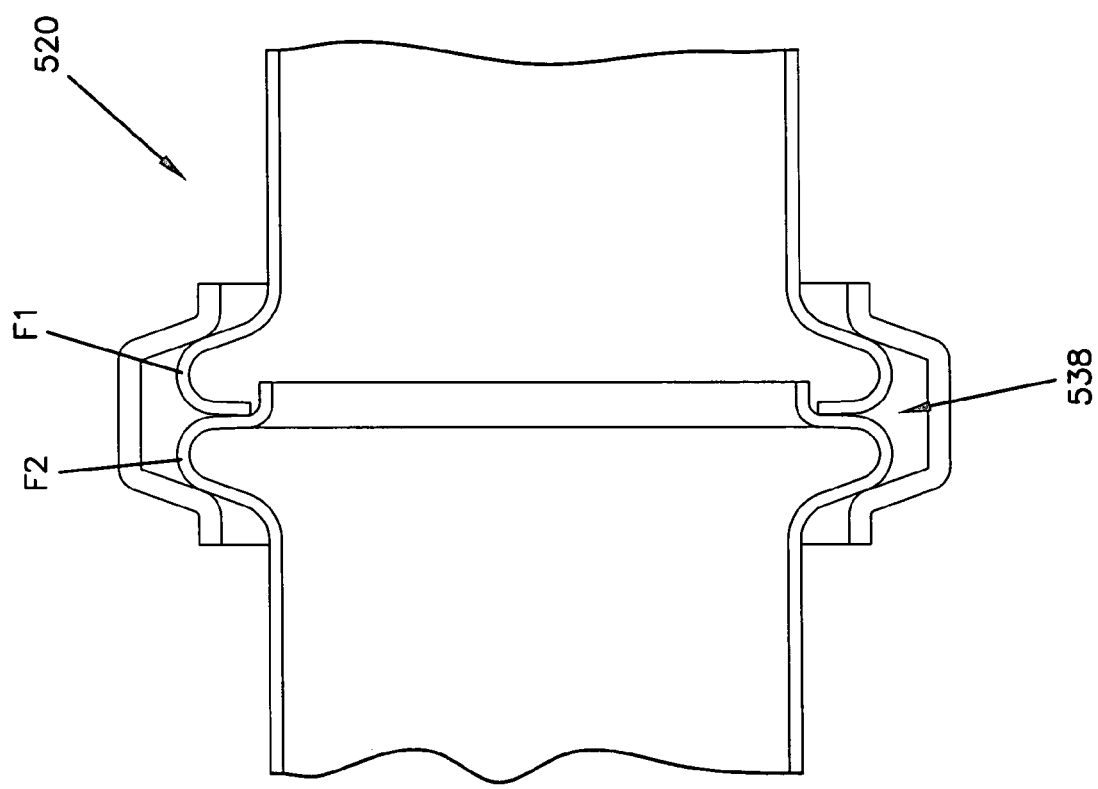
FIG. 9 illustrates an exhaust system component that is a sixth embodiment in accordance with the principles of the present disclosure.

FIG. 9 shows a sixth access joint 538 in accordance with the principles of the present disclosure. The access joint is part of an exhaust system component 520 having the same configuration as the exhaust system component 420 of FIG. 8, except that flanges F1, F2 have a shorter profile.

Figure 10:
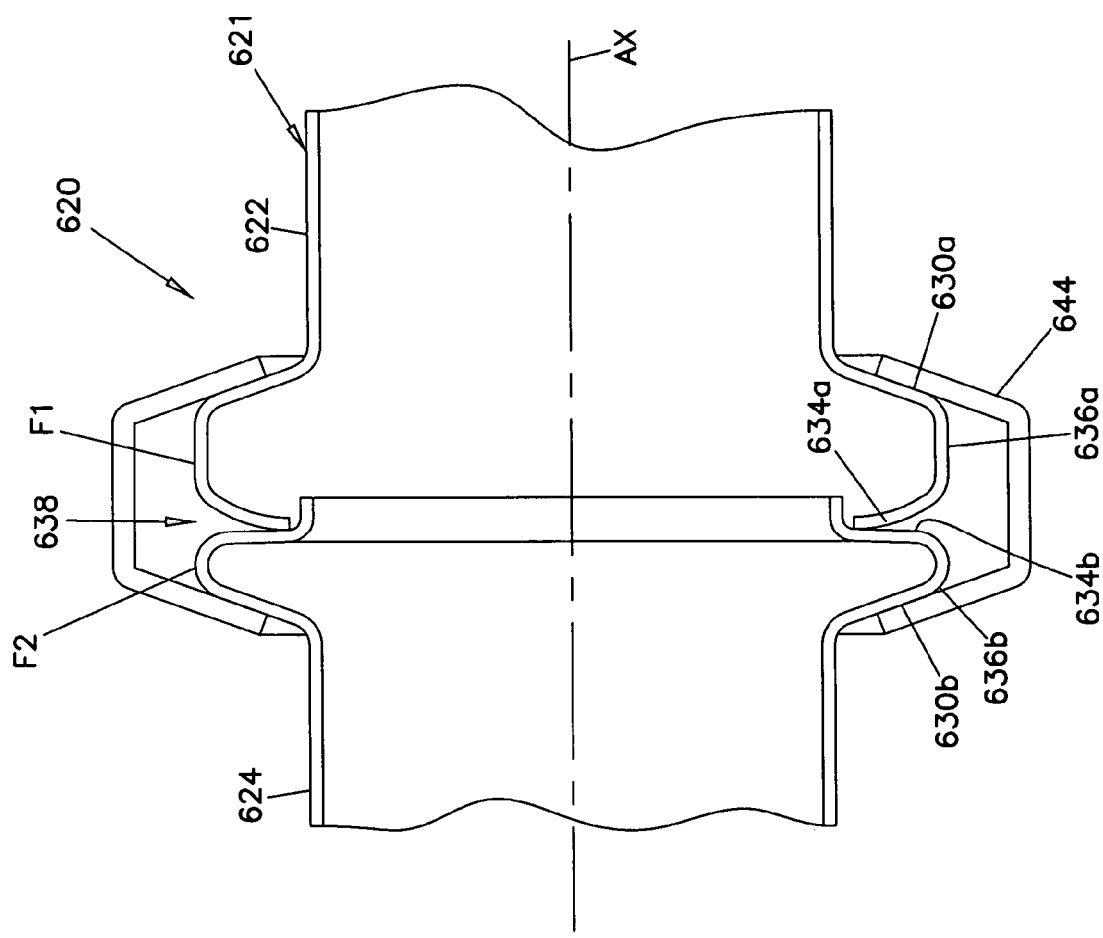
FIG. 10 illustrates an exhaust system component that is a seventh embodiment in accordance with the principles of the present disclosure.

FIG. 10 shows a seventh access joint 638 in accordance with the principles of the present disclosure. The access joint 638 is part of an exhaust system component 620 including a main outer body 621 defined by first and second conduits 622, 624. Flanges F1, F2 are provided at ends of the conduits 622, 624. The flanges F1, F2 extend about the entire perimeters of the conduits 622, 624. Each of the flanges F1, F2 includes a clamping shoulder 630a, 630b and a sealing portion 634a, 634b. The clamping shoulders 630a, 630b are connected to the sealing portions 634a, 634b by bridge portions 636a, 636b. The sealing portion 634b defines a planar sealing surface, while the sealing portion 634a defines a convex sealing surface. The bridge portion 636b is curved, while the bridge portion 636a includes a linear extension for lengthening the bridge portion 636a. The clamping shoulder portions 630a, 630b are angled so as to converge towards one another as the shoulders 630a, 630b extend away from a central axis AX of the exhaust component 620. A clamp 644 such as a v-band clamp or other type of clamp is used to compress the flanges F1, F2 together to provide an annular seal between the flanges.

Figure 11:
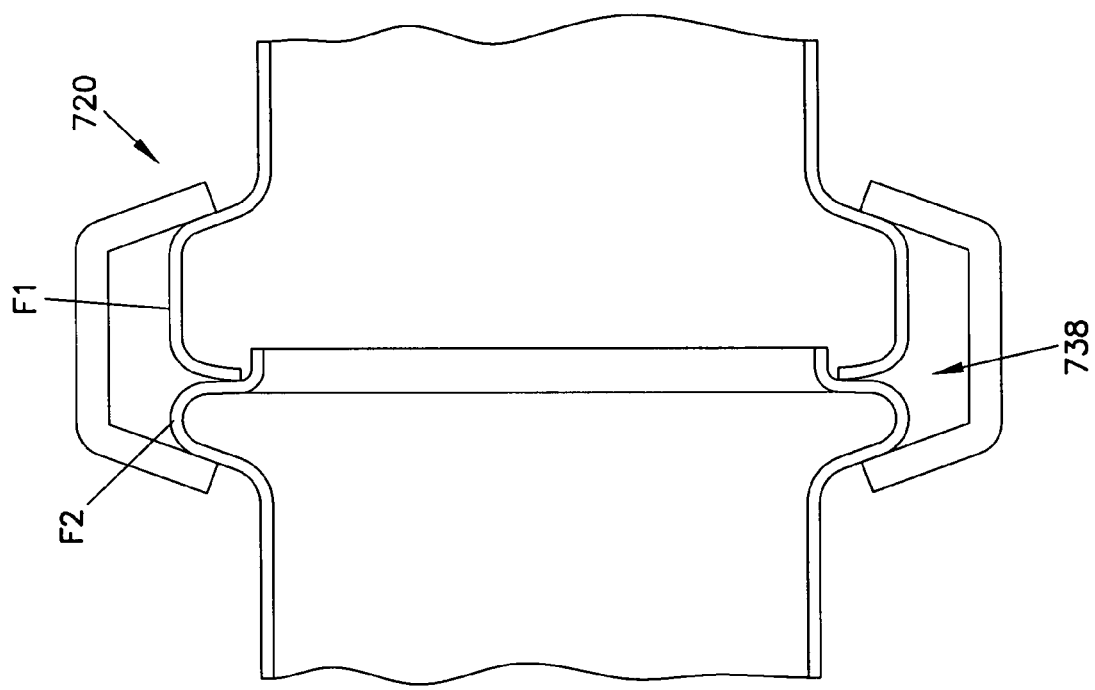
FIG. 11 illustrates an exhaust system component that is a eighth embodiment in accordance with the principles of the present disclosure.

FIG. 11 shows an eighth access joint 738 in accordance with the principles of the present disclosure. The access joint 738 is part of an exhaust system component 720 having the same configuration as the embodiment of FIG. 10, except that the flange F1 has a lengthened bridge portion.

Figure 12:
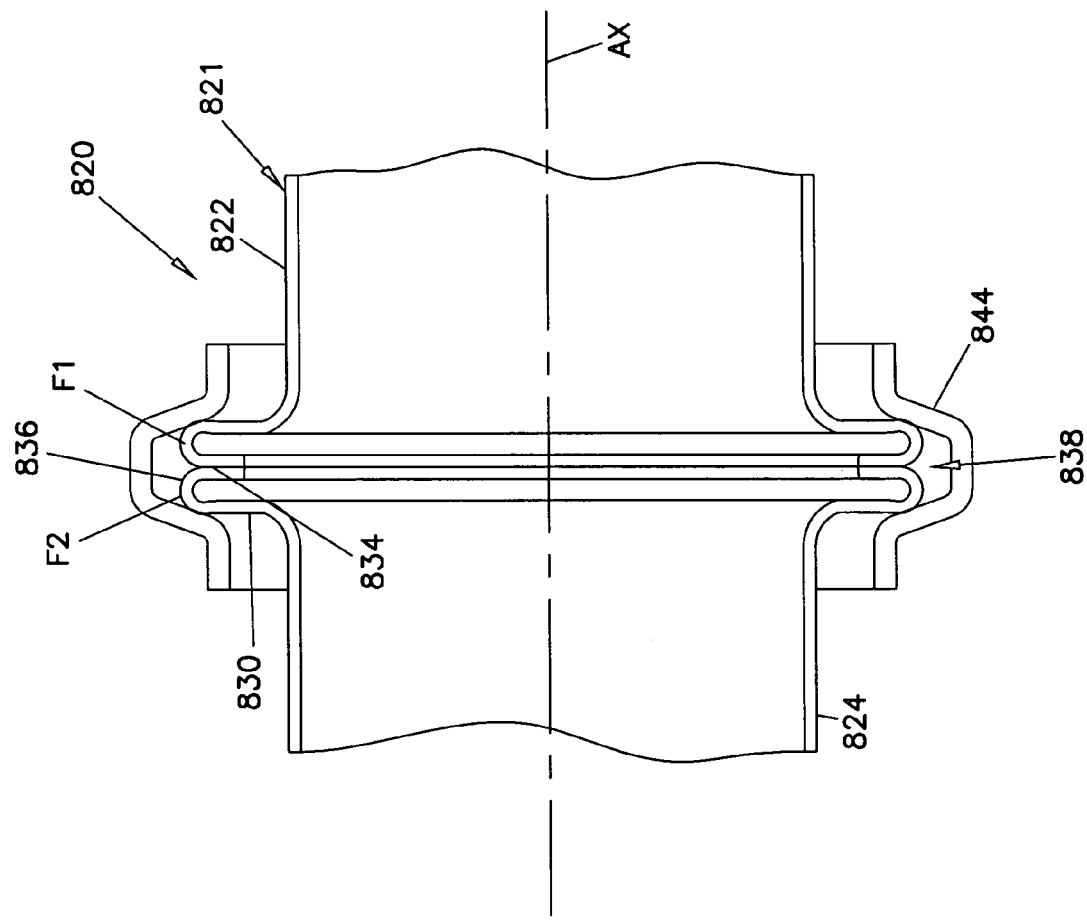
FIG. 12 illustrates an exhaust system component that is a ninth embodiment in accordance with the principles of the present disclosure.

FIG. 12 shows a ninth access joint 838 in accordance with the principles of the present disclosure. The access joint 838 is part of an exhaust system component 820 including a main outer body 821 defined by first and second conduits 822, 824. The ends of each of the conduits define flanges F1, F2. The flanges F1, F2 extend about the perimeters of the conduits 822, 824. The flanges F1, F2 have identical configurations with each flange including a clamping shoulder 830, a sealing portion 834 and a curved bridge portion 836. The clamping shoulders 830 as well as the sealing portions 834 are aligned generally at perpendicular angles relative to a central longitudinal axis AX of the component 820. A clamp 844 such as a v-band clamp is used to compress the flanges F1, F2 together to provide an annular seal between the sealing portions 834.

Figure 13:
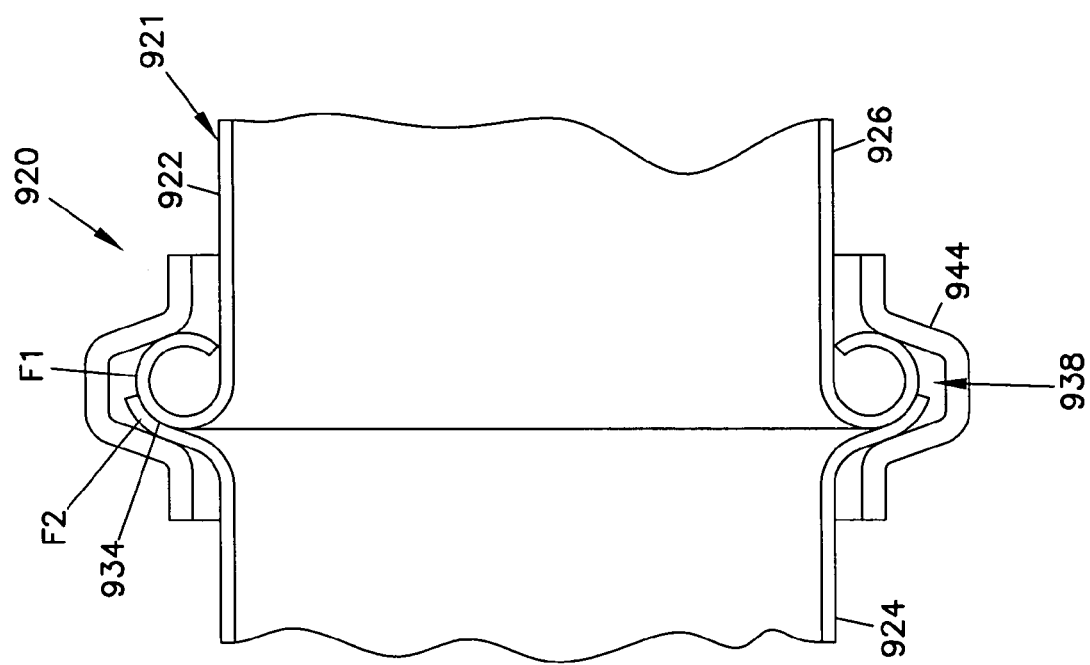
FIG. 13 illustrates an exhaust system component that is a tenth embodiment in accordance with the principles of the present disclosure.

FIG. 13 shows a tenth access joint 938 in accordance with the principles of the present disclosure. The access joint 938 is part of an exhaust system component 920 including a main outer body 921 formed by a first conduit 922 and a second conduit 924. Flanges F1, F2 are provided at the ends of the conduits 922, 924 and extend about the perimeters of the conduits. The flange F2 flares radially outwardly from the main body of the conduit 924 to define a skirt-like structure at the end of the conduit 924. A sealing portion 934 of the flange F2 defines a concave curvature that faces toward the flange F1. The flange F1 is defined by rolling or bending back an end portion of the second conduit 922. The flange F1 has a toroidal shape that extends about the perimeter of the second conduit 922. The flange F1 has a convex curvature that conforms or nests with the concave curvature of the flange F2. The nesting relationship provides a pilot/alignment function. A clamp 944 such as a v-band clamp is used to compress the flanges F1, F2 together.

Figure 14:
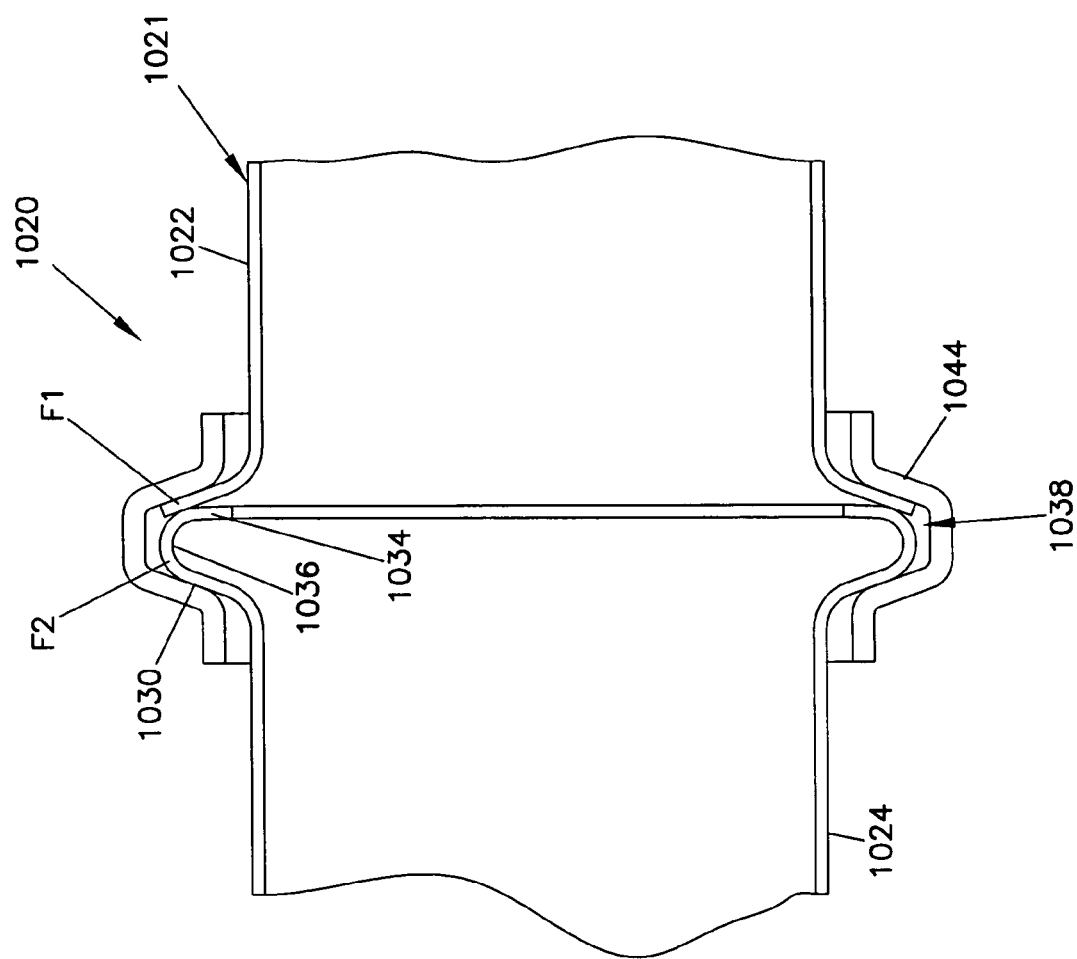
FIG. 14 illustrates an exhaust system component that is a eleventh embodiment in accordance with the principles of the present disclosure.

FIG. 14 shows an eleventh access joint 1038 in accordance with the principles of the present disclosure. The access joint 1038 is part of an exhaust system component 1020 including a main outer body 1021 defined by first and second conduits 1022 and 1024. Flanges F1, F2 are integrally formed at the ends of the conduits 1022, 1024. The flange F2 has a clamping shoulder portion 1030, a sealing portion 1034 and a bridge portion 1036 that connects the clamping shoulder 1030 to the sealing portion 1034. The flange F1 is defined by a flared skirt that projects radially outwardly from the main body of the conduit 1022. The skirt includes a planar sealing surface that engages a convex surface of the flange F2 to provide an annular seal between the flanges F1, F2. A clamp 1044 or other fastening structure is used to compress the flanges F1, F2 together to provide a seal between the flanges.

Figure 15:
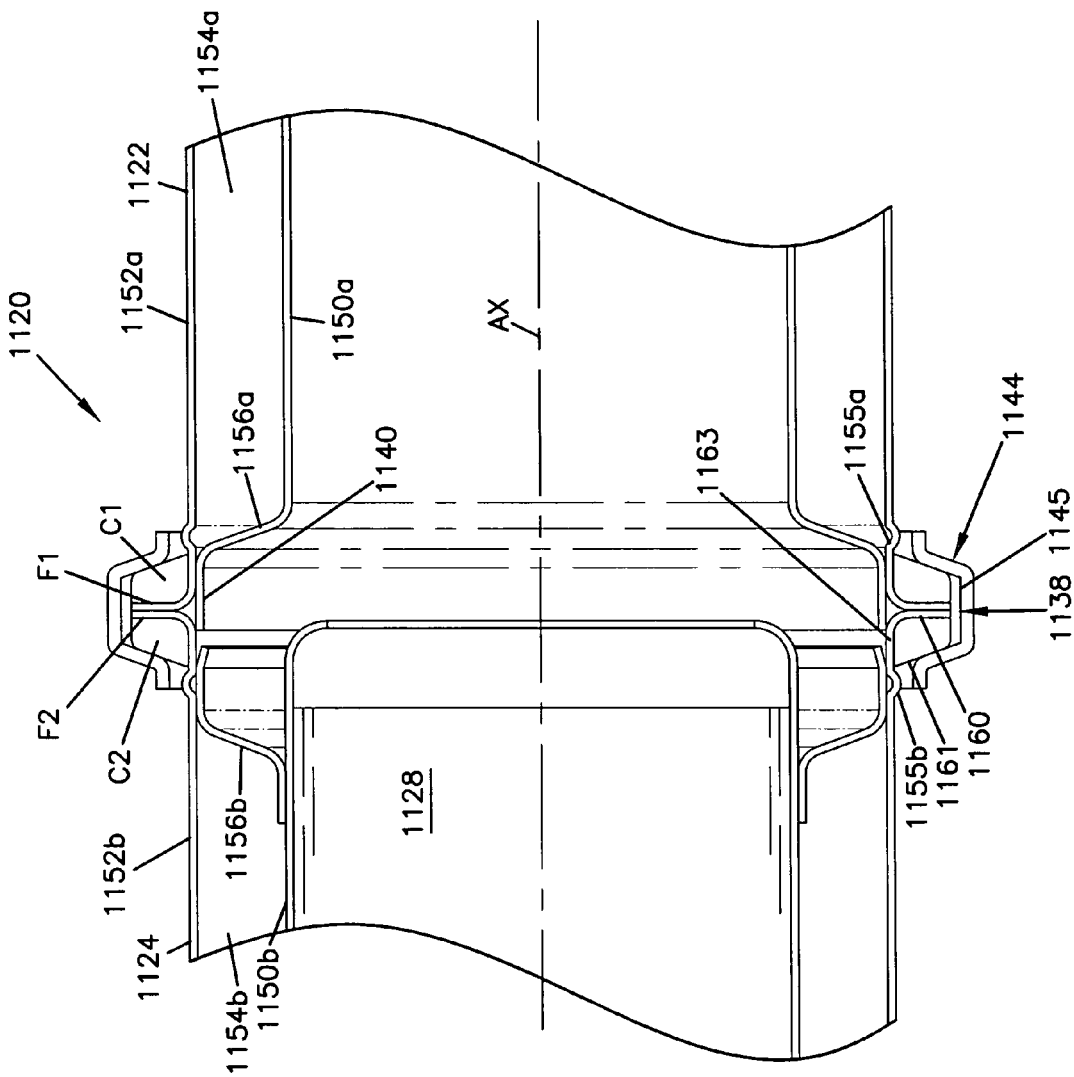
FIG. 15 is a cross-sectional view of an access joint in accordance with the principles of the present disclosure.

FIG. 15 illustrates a twelfth access joint 1138 in accordance with the principles of the present disclosure. The access joint 1138 is defined between first and second sections 1122, 1124 of the body of an exhaust system component 1120. The sections 1122, 1124 include opposing flanges F1, F2 between which the joint 1138 is defined. The flanges F1, F2 are reinforced by exterior collars C1, C2. A clamp 1144 (e.g., a v-band clamp) is mounted over the exterior collars C1, C2. When tightened, the clamp functions to compress the flanges F1, F2 and the collars C1, C2 together in an axial direction. The axial direction is generally parallel to a central axis AX of the exhaust system component 1120.

Referring still to FIG. 15, the sections 1122, 1124 each have a double wall construction including inner walls 1150a, 1150b separated from outer walls 1152a, 1152b by annular insulating gaps 1154a, 1154b. The insulating gaps 1154a, 1154b are preferably filled with air and can also include insulating material such as fiberglass, ceramic or other materials. The inner and outer walls 1150a, 1150b, 1152a, 1152b are preferably generally cylindrical. A spacer 1156b extends radially between the inner and outer walls 1150b, 1152b and is secured in place by conventional techniques (e.g., welds). A spacer 1156a extends radially between the inner and outer walls 1150a, 1152a. An outer portion of the spacer 1156a is secured (e.g., welded) to the outer wall 1152a, while an inner end of spacer 1156a is integral with the inner wall 1150a. The spacer 1156a includes a pilot portion 1140. When the first and second sections 1122, 1124 of the exhaust system component 1120 are joined together, the pilot portion 1140 fits inside the outer wall 1152b of the second section 1124 to assist in maintaining axial alignment between the sections 1122, 1124. The pilot portion 1140 can also function to hold/capture a gasket (e.g., an o-ring style gasket a flat washer style gasket, or other style of gasket) adjacent the flanges F1, F2. The inner wall 1150b includes an inwardly curved portion that functions to assist in retaining an aftertreatment device 1128 (e.g., a diesel particulate filter) within the second section 1124 of the exhaust system component 1120.

Referring still to FIG. 15, the flanges F1, F2 are shown being integral/unitary with their corresponding outer walls 1152a, 1152b. By integral/unitary, it is meant that the flanges F1, F2 and their respective outer walls 1152a, 1152b are made from the same piece of material (e.g., the same sheet of metal) with no seams, joints or welds provided therebetween for connecting the flanges to the outer walls. For example, the flanges F1, F2 can be formed by bending end portions of the outer walls 1152a, 1152b radially outwardly relative to the main bodies of the outer walls 1152a, 1152b. Thus, no seams (e.g., as would be provided at a weld) or other possible leak points are defined between the flanges F1, F2 and the main bodies of the outer walls 1152a, 1152b. The flanges F1, F2 include first surfaces adapted to face toward one another when the sections 1122, 1124 are connected together. In the embodiment of FIG. 15, the first surfaces are shown making metal-to-metal contact. However, in other embodiments, gasketing material can be positioned between the first surfaces of the flanges F1, F2. The flanges F1, F2 also include second surfaces adapted to face away from one another when the sections 1122, 1124 are connected together. The collars C1, C2 are shown abutting the second surfaces of the flanges F1, F2 to reinforce the flanges F1, F2.

Figure 15A:
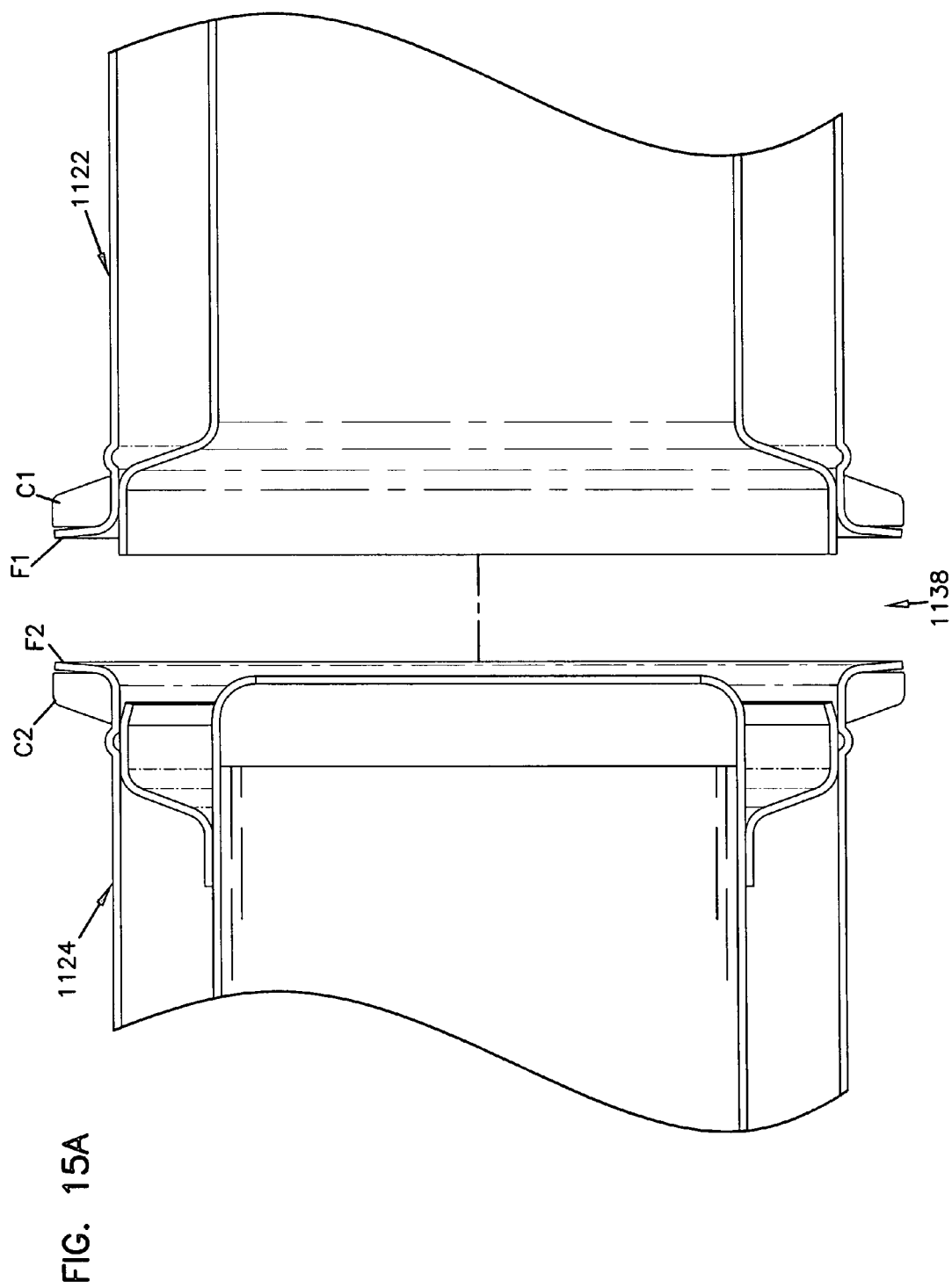
FIG. 15A shows the access joint of FIG. 15 in a disassembled orientation.

FIG. 15A shows the access joint 1138 in a disconnected orientation with the clamp 1144 removed. In this orientation, the flanges F1 and F2 can be angled slightly outwardly from their corresponding collars C1, C2. This provides some "play" for allowing the flanges F1, F2 to flex toward one another when the clamp 1144 is tightened about the access joint 1138. Also, in certain embodiments, the flanges can have heights equal to or shorter than the heights of their corresponding collars. In this way, the collars protect the flanges from being bent or otherwise damaged.

Figure 17:
FIG. 17 is cross-sectional view taken along section line 17-17 of FIG. 16.
Figure 16:
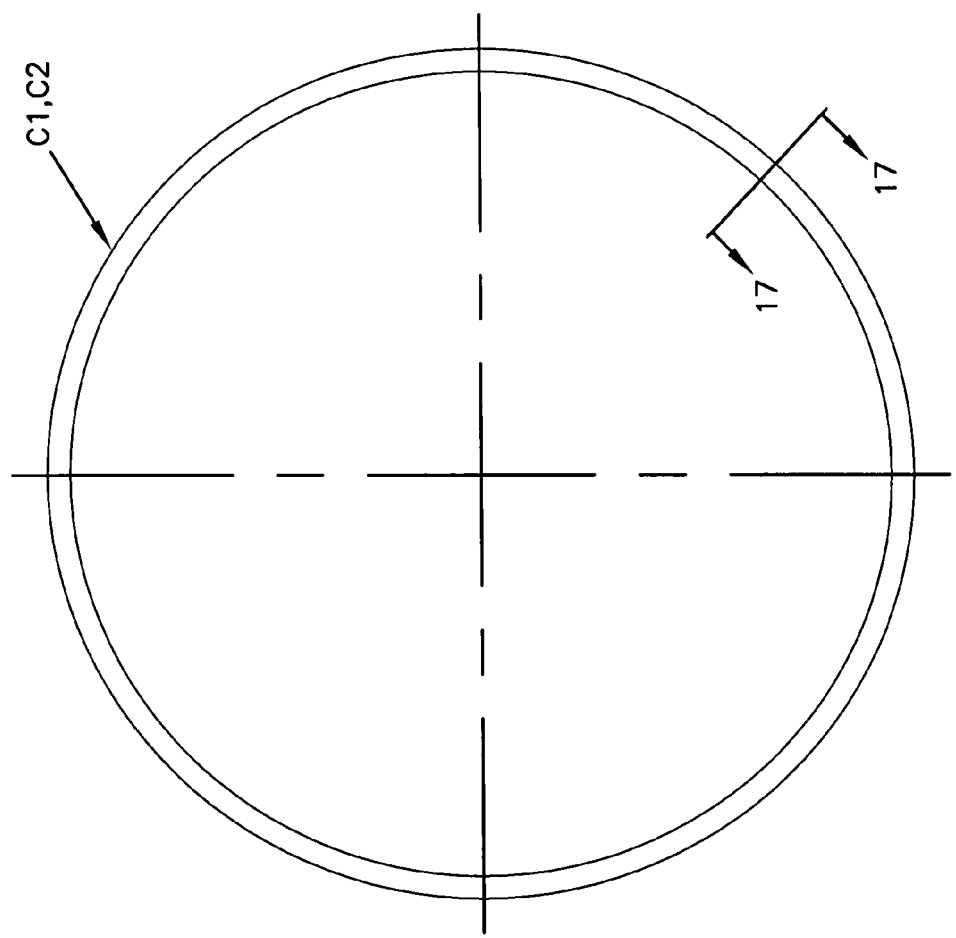
FIG. 16 is an end view of a collar used to reinforce the access joint of FIG. 15.

Referring to FIG. 16, the collars C1, C2 are ring-shaped and have interior diameters sized to allow the collars C1, C2 to snuggly fit over the exteriors of the sections 1122, 1124. In one embodiment, the collars can be made of a metal material such as steel or stainless steel. The collars C1, C2 can be cast, machined, extruded and rolled, roll-formed or manufactured by other techniques. As shown at FIGS. 15 and 17, first sides 1160 of the collars C1, C2 are shaped to conform generally to the second sides of the flanges F1, F2. As also shown at FIGS. 15 and 17, second sides 1161 of the collars C1, C2 are angled/tapered. For example, the second sides 1161 can define clamping shoulders/surfaces aligned at an oblique angle relative to the axis AX of the exhaust system component. The collars C1, C2 also include inner surfaces 1163 that face inwardly toward the exteriors of sections 1122, 1124.

In certain embodiments, the taper angle of the sides 1161 matches a corresponding taper angle of a channel segments 1145 of the clamp 1144. The channel segments 1145 have a generally v-shaped cross-sections. The clamp 1144 can be tightened by turning a bolt to constrict the diameter of the clamp (e.g., see clamp 44 of FIGS. 3 and 4). As the clamp 1144 is tightened, the angled portions of the channel 1145 engage the tapered second sides 1161 of the collars C1, C2 causing the collars C1, C2 and the flanges F1, F2 to be compressed together.

The exhaust system component sections 1122, 1124 can include structure for holding the collars C1, C2 in place adjacent to the flanges F1, F2. For example, the sections 1122, 1124 can include one or more projections 1155a, 1155b that project radially outwardly from the main bodies of the outer walls 1152a, 1152b. The collars C1, C2 are shown captured between the projections 1155a, 1155b and the flanges F1, F2. In certain embodiments, the projections 1155a, 1155b can be annular shoulders that project outwardly from the main bodies of the outer walls 1152a, 1152b. In certain embodiments, the annular shoulders extend about portions of the circumferences of the main bodies. In still other embodiments, the annular shoulders extend completely about the circumferences of the main bodies. In still other embodiments, the projections 1155a, 1155b may be dimples, bumps, dents or other structures. The projections eliminate the need to secure the collars in place by other means (e.g., welds). However, in alternative embodiments, welds (e.g., spot welds or other welds) may be used.

In certain embodiments, prior to forming the flanges F1, F2, the collars C1, C2 can be installed by placing the collars over the outsides of the sections 1122, 1124 adjacent the ends of the sections 1122, 1124. The flanges F1, F2 can then be formed using a metal forming machine (e.g., a metal bending or rolling machine) to share the flanges F1, F2. The metal forming machine is then used to form the projections 1155a, 1155b such that the collars C1, C2 are captured between the flanges F1, F2 and the projections 1155a, 1155b.

In assembling the joint 1138, the flanged ends of the sections 1122, 1124 are placed together with the pilot portion 1140 of section 1122 inserted inside the outer wall 1152b of section 1124. The clamp 1144 is then placed over the joint and tightened. When the clamp 1144 is tightened, the taper of the v-band channel contacts the angled clamping shoulders/surfaces 1161 collars C1, C2 causing the flanges F1, F2 and the collars C1, C2 to be compressed together. In this way, the opposing surfaces of the flanges F1, F2 are compressed together in metal-to-metal contact. The joint 1138 is disassembled by removing the clamp 1144, and axially pulling the sections 1122, 1124 apart.

Figure 18:
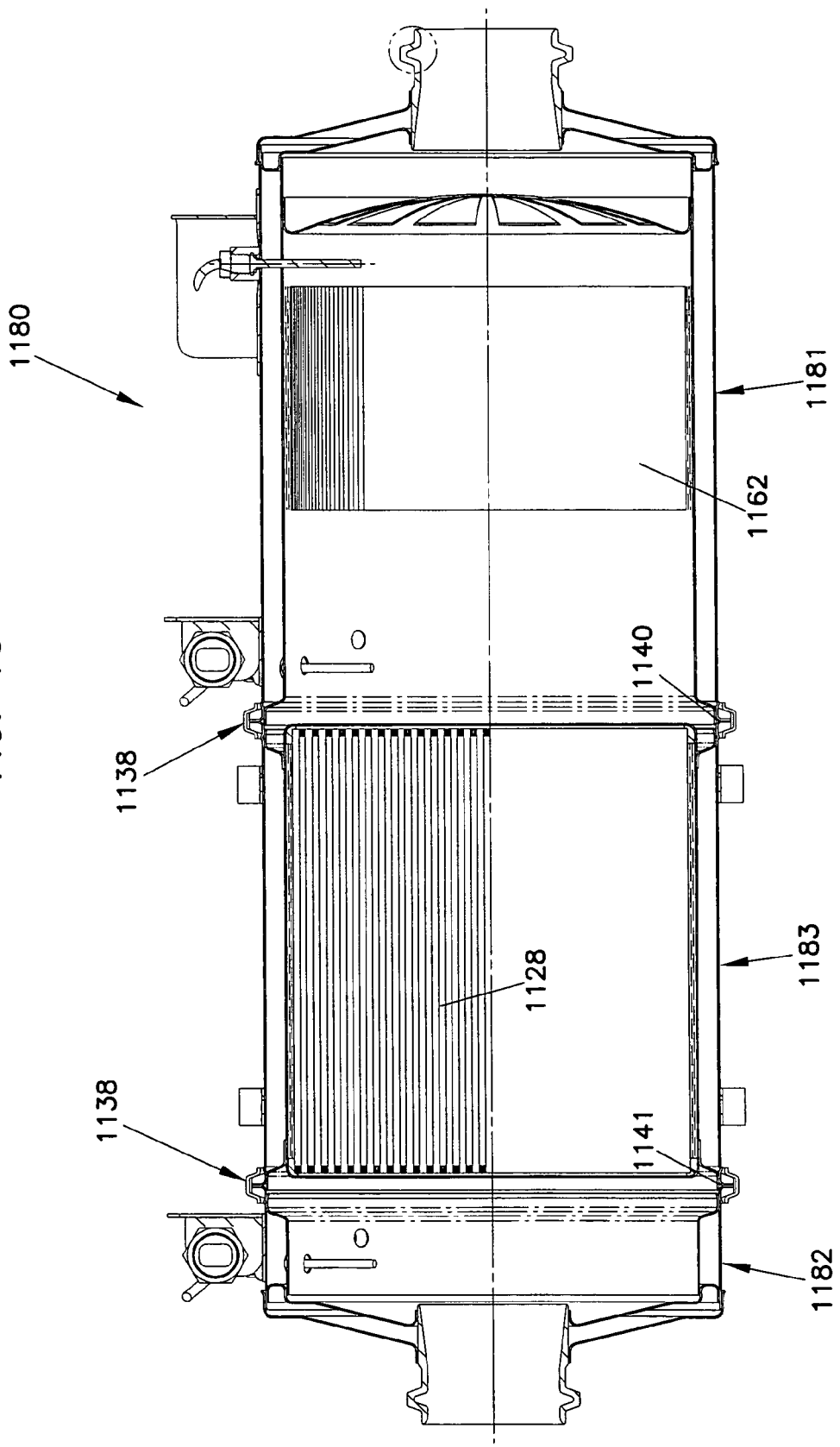
FIG. 18 shows an exhaust system component incorporating access joints of the type shown at FIG. 15.

FIG. 18 shows an exhaust system component 1180 including an inlet section 1181, an outlet section 1182 and an intermediate section 1183. A diesel particulate filter 1128 is mounted within the intermediate section 1183 and a diesel oxidation catalyst 1162 (e.g., a catalytic converter) is positioned in the inlet section 1181. A first access joint 1138 is positioned between the inlet section 1181 and the intermediate section 1183, and a second access joint 1138 is positioned between the outlet section 1182 and the intermediate section 1183. The joints 1138 allow the diesel particulate filter 1128 to be easily accessed for servicing (e.g., cleaning). The intermediate section 1183 includes a pilot portion 1141 and the inlet section 1181 includes pilot portion 1140. The pilot portions 1140, 1141 are configured such that the intermediate section 1183 can only be mounted in one direction between the inlet and outlet sections 1181, 1182. This prevents the intermediate section 1183 from being mounted backwards within the component 1180. If an operator attempts to mount the intermediate section 1183 backwards, the pilot portions 1140, 1141 interfere with one another to prevent assembly.

While the joints 1138 have been depicted in use with a double-walled unit/component, it will be appreciated that joints in accordance with the principles of the present disclosure can be used any type of exhaust system conduits, whether single walled or double walled.

Figure 19:
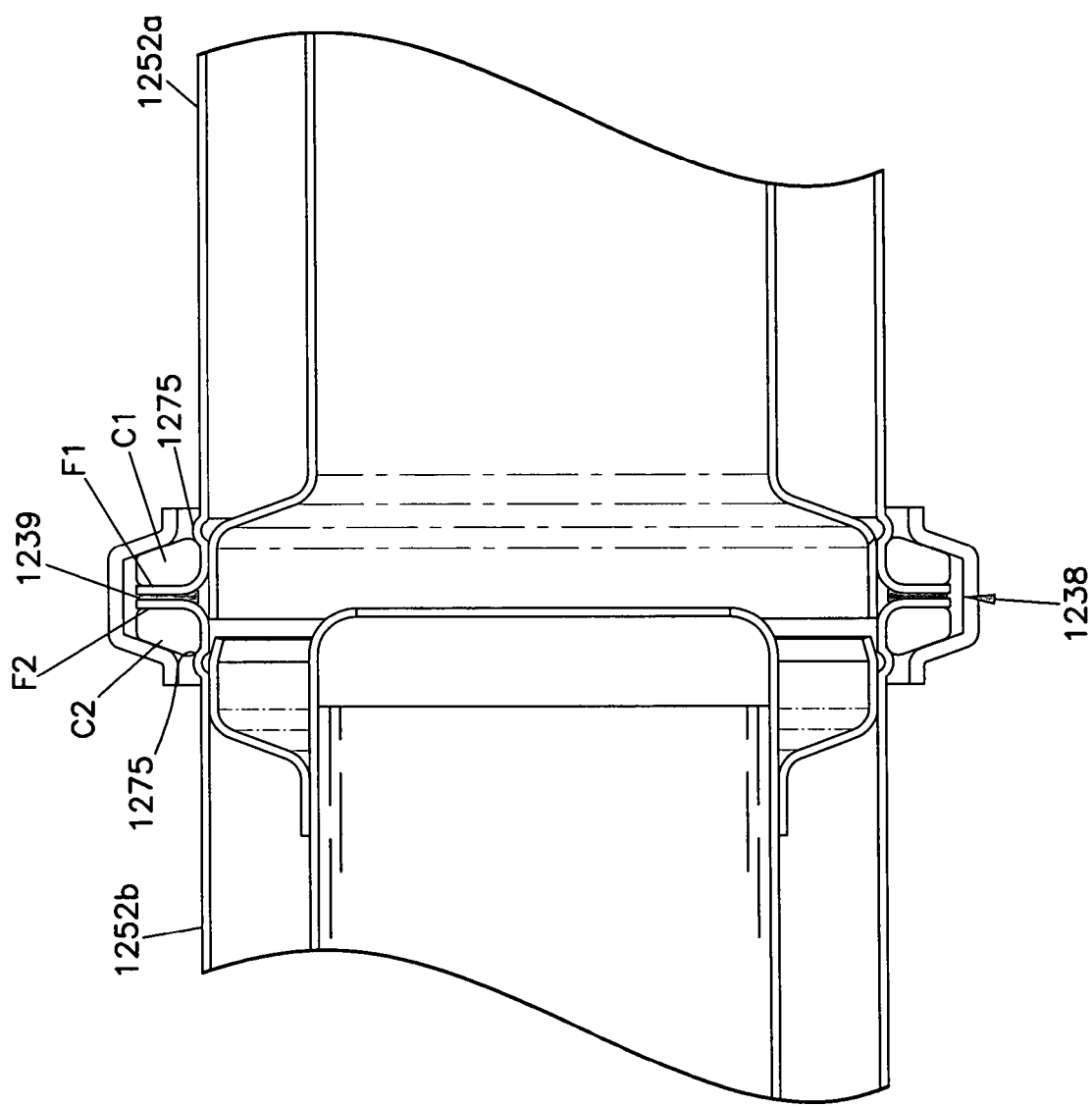
FIG. 19 is a cross-sectional view of another access joint in accordance with the principles of the present disclosure.

FIG. 19 shows an alternative joint 1238 having a gasket 1239 positioned between flanges F1, F2. The joint 1238 also includes collars C1, C2 that have been modified to include rounded corners 1275 so that the collars can more easily be pressed over exteriors of outer walls 1252a, 1252b during assembly. The gasket 1239 can be made of materials such as stainless steel, graphite, metal foil, ceramic fiber or other materials.

Figure 20:
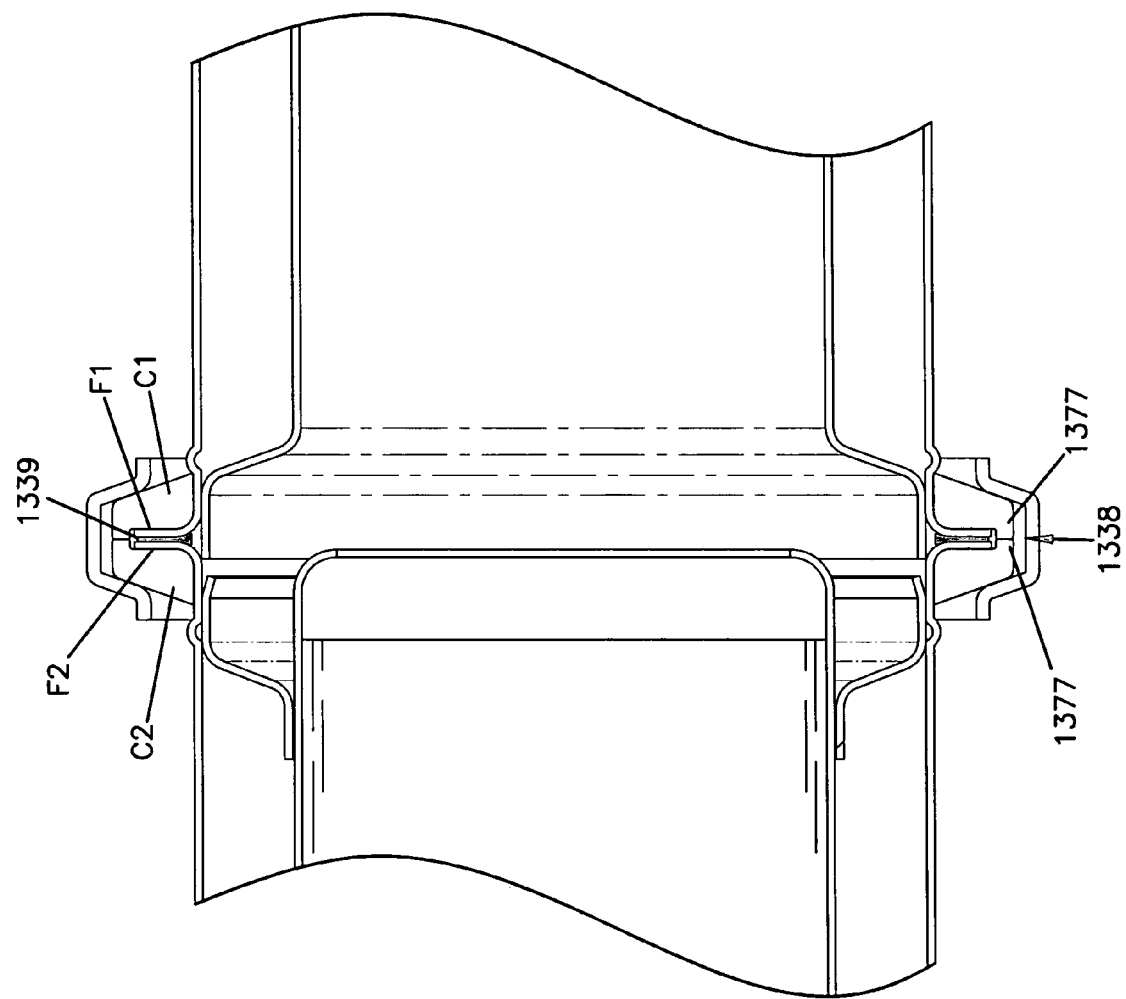
FIG. 20 is a cross-sectional view of a further access joint in accordance with the principles of the present disclosure.

FIG. 20 shows another alternative access joint 1338 having a gasket 1339 positioned between flanges F1, F2. The joint 1338 includes collars C1, C2 that have been modified to include positive stops 1377 that contact one another during tightening of the joint clamp to prevent the gasket 1339 from being over-compressed.

Figure 21:
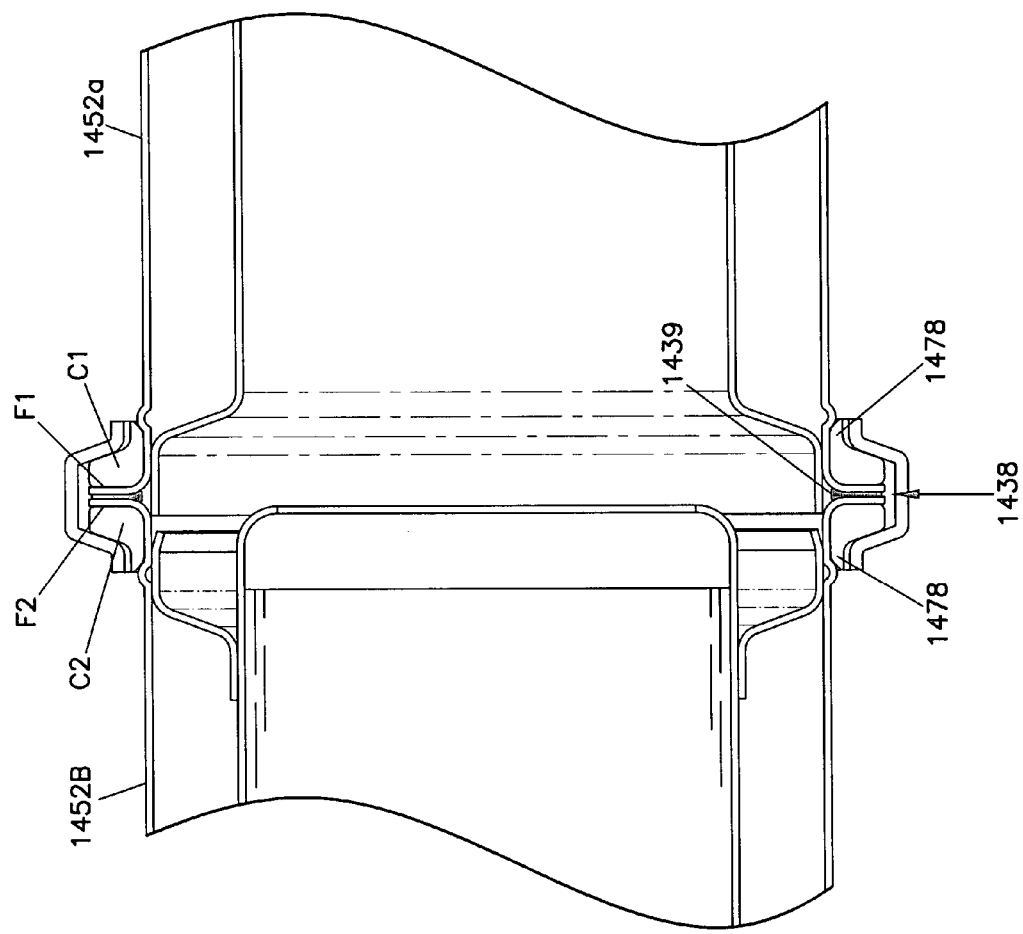
FIG. 21 is a cross-sectional view of a further access joint in accordance with the principles of the present disclosure.

FIG. 21 shows a further alternative access joint 1438 having a gasket 1439 positioned between flanges F1, F2. The joint 1438 includes collars C1, C2 that have been modified to include extensions 1478 that increase the contact area between the collars C1, C2 and the outer surfaces of outer walls 1452a, 1452b to assist in stabilizing the collars C1, C2.

Each of the exhaust system components depicted herein has sealing flanges that are unitary with main outer walls/bodies of the components. However, it will be appreciated that the disclosure also relates to the flange configurations themselves and to flange reinforcing configurations. These aspects of the disclosure are separate from how the flanges are connected to the main bodies of the components. Thus, the various aspects of the disclosure may include both unitary and non-unitary uses of the flange configurations. Furthermore, in any of the above embodiments, gaskets can be used between the contact surfaces of the flanges to enhance sealing. Moreover, certain embodiments may have a double wall configuration to provide a thermal insulating region. Double wall configurations are described further in U.S. patent application Ser. No. 11/223,460, and entitled "Construction for an Engine Exhaust System Component", which was filed on a date concurrent herewith, and which is hereby incorporated by reference in its entirety.

The above specification provides examples of how certain inventive aspects may be put into practice. It will be appreciated that the inventive aspects can be practiced in other ways than those specifically shown and described herein without departing from the spirit and scope of the inventive aspects.

What is claimed is:

1. An access joint for an engine exhaust system, the access joint comprising:
   first and second exhaust conduits each having a double wall construction, the double wall construction including an inner wall and an outer wall, the outer wall of each of the first and second exhaust conduits forming a flange that is unitary with the outer wall, the inner wall of the first exhaust conduit forming a pilot portion that extends toward an inner surface of the outer wall of the first exhaust conduit and beyond the flange of the first exhaust conduit, the pilot portion contacting an inner surface of the outer wall of the second exhaust conduit for aligning the first and second exhaust conduits;
   the flanges having first surfaces that face toward one another and second surfaces that face away from one another;
   reinforcing collars mounted around the outer walls of the first and second exhaust conduits, wherein the reinforcing collars are adjacent to the second surfaces of the flanges; and
   a clamp having a channel that receives the flanges and the reinforcing collars, wherein the clamp compresses the flanges toward one another when the clamp is tightened.

2. The access joint of claim 1, wherein the first surfaces of the flanges make metal-to-metal contact when the clamp is tightened.

3. The access joint of claim 1, wherein the reinforcing collars include clamp engaging surfaces that face away from the flanges, the clamp engaging surfaces converging as the clamping surfaces extend away from a center axis defined by the first and second exhaust conduits.

4. The access joint of claim 1, further comprising retaining projections that project outwardly from the outer walls of the first and second exhaust conduits, the retaining projections being integral with the outer walls of the first and second exhaust conduits, the reinforcing collars being captured between the flanges and the retaining projections.

5. The access joint of claim 1, wherein the reinforcing collars include clamp engaging surfaces that face away from the flanges and inner surfaces that engage the outer walls of the first and second exhaust conduits, and wherein the reinforcing collars include inner rounded corners that extend from the clamp engaging surfaces to the inner surfaces.

6. The access joint of claim 1, wherein the reinforcing collars include stabilizing extensions that extend axially outwardly from clamp engaging surfaces in a direction along the outer walls of the first and second exhaust conduits.

7. The access joint of claim 1, wherein the first surface of one of the flanges is curved and generally tangentially engages the first surface of the other of the flanges.

8. The access joint of claim 1, wherein the first surfaces of the flanges have complementing curved portions that engage one other when the clamp is tightened.

9. The access joint of claim 1, wherein at least one of the first surfaces of the flanges has a convex curvature.

10. The access joint of claim 1, wherein the flanges define nesting tapered shapes.

11. The access joint of claim 1, wherein a gasket is positioned between the first surfaces of the flanges.

12. The access joint of clam 11, wherein the reinforcing collars have positive stops to prevent the gasket from being over-compressed.

13. The access joint of claim 1, wherein the retaining projections include annular ridges formed in the outer walls of the first and second exhaust conduits.

14. The access joint of claim 13, wherein the flanges and annular ridges are formed by rolling portions of the outer walls with the reinforcing collars in place such that the reinforcing collars are captured between the annular ridges and the flanges.

15. The access joint of claim 1, wherein an exhaust aftertreatment device is mounted within at least one of the exhaust conduits.

16. The access joint of claim 15, wherein the exhaust aftertreatment device includes a diesel particulate filter.

17. The access joint of claim 1, wherein the inner and outer walls of the first and second exhaust conduits are separated by annular insulating gaps.

18. The access joint of claim 17, further comprising a spacer that extends radially between the inner and outer walls, an outer portion of the spacer being secured to the outer wall and an inner end of the spacer being integral with the inner wall, wherein the spacer includes the pilot portion.

19. An exhaust system component comprising:

first and second component sections defining an axis of the exhaust system component, each of the first and second component sections having a double wall configuration including an inner wall and an outer wall, wherein flanges are unitarily formed at ends of the outer walls of the first and second component sections, the inner wall of the first exhaust conduit forming a pilot portion that tapers toward an inner surface of the outer wall of the first exhaust conduit and extends beyond the flange of the first exhaust conduit, the pilot portion contacting an inner surface of the outer wall of the second exhaust conduit for aligning the first and second exhaust conduits;

an aftertreatment device mounted within the second component section;

the flanges having first surfaces that face axially toward one another and second surfaces that face axially away from one another;

reinforcing collars mounted around the first and second component sections adjacent the second surfaces of the flanges, the reinforcing collars having taper surfaces that converge toward one another as the taper surfaces extend away from the axis of the exhaust system component; and a clamp for coupling the first and second component sections together, the clamp including:

a strap having an outer surface and an inner surface;

a plurality of channel segments secured to the inner surface of the strap, the plurality of channel segments defining a channel that receives the flanges and the reinforcing collars, the channel being configured to compress the flanges and the reinforcing collars together when the clamp is tightened.

20. The exhaust system component of claim 19, wherein the taper surfaces and the channel of the clamp define taper angles that generally match one another.

21. The exhaust system component of claim 19, wherein the reinforcing collars have rounded inner corners for facilitating inserting the reinforcing collars over the component sections during assembly.

22. The exhaust system component of claim 19, wherein the flanges flex away from their corresponding reinforcing collars when the component sections are disconnected from one another.

23. An exhaust system component comprising:

a first component section having a double wall configuration including an inner wall and an outer wall, the inner and outer walls being separated by a first annular gap, the first component section having a first flange formed at one end of one of the inner and outer walls;

a second component section having a double wall configuration including an inner wall and an outer wall, the inner and outer walls being separated by a second annular gap, the second component section having a second flange formed at one end of one of the inner and outer walls;

a pilot portion formed at an end of one of the first and second component sections for aligning the first and second component sections;

the first and second flanges having first surfaces that face axially toward one another and second surfaces that face axially away from one another;

reinforcing collars mounted around the first and second component sections adjacent the second surfaces of the first and second flanges, wherein the first surfaces of the first and second flanges are angled outwardly from their corresponding reinforcing collars in a disconnected orientation so as to form oblique angles with central longitudinal axes of the first and second component sections; and a clamp for coupling the first and second component sections together, the clamp having a channel that receives the flanges and the reinforcing collars, the channel being configured to compress the flanges and the reinforcing collars together when the clamp is tightened.

24. The exhaust system component of claim 23, wherein the second surfaces of the first and second flanges are angled outwardly from their corresponding reinforcing collars in a disconnected orientation so as to form oblique angles with the central longitudinal axes of the first and second component sections.

* * * * *